United States Patent
Kuwamura et al.

(10) Patent No.: US 11,629,610 B2
(45) Date of Patent: Apr. 18, 2023

(54) ROTATING MACHINE

(71) Applicant: Mitsubishi Power, Ltd., Yokohama (JP)

(72) Inventors: Yoshihiro Kuwamura, Tokyo (JP); Chongfei Duan, Tokyo (JP); Hideaki Sugishita, Tokyo (JP); Kazuyuki Matsumoto, Tokyo (JP); Hideki Ono, Tokyo (JP); Kiyoshi Segawa, Kanagawa (JP); Hisataka Fukushima, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 103 days.

(21) Appl. No.: 17/423,178

(22) PCT Filed: Nov. 13, 2019

(86) PCT No.: PCT/JP2019/044476
§ 371 (c)(1),
(2) Date: Jul. 15, 2021

(87) PCT Pub. No.: WO2020/158104
PCT Pub. Date: Aug. 6, 2020

(65) Prior Publication Data
US 2022/0186628 A1 Jun. 16, 2022

(30) Foreign Application Priority Data

Jan. 31, 2019 (JP) .............................. JP2019-015194

(51) Int. Cl.
*F01D 11/08* (2006.01)
*F01D 9/02* (2006.01)
*F01D 25/24* (2006.01)

(52) U.S. Cl.
CPC ............... *F01D 11/08* (2013.01); *F01D 9/02* (2013.01); *F01D 25/24* (2013.01);
(Continued)

(58) Field of Classification Search
CPC . F01D 9/02; F01D 11/08; F01D 25/24; F01D 5/225; F02C 7/28; F16J 15/447;
(Continued)

(56) References Cited

U.S. PATENT DOCUMENTS 9,726,027 B2  8/2017  Kuwamura et al.
10,247,025 B2  4/2019  Matsumoto et al.
(Continued)

FOREIGN PATENT DOCUMENTS

CN   103097666 A   5/2013
CN   105074134 A   11/2015
(Continued)

OTHER PUBLICATIONS

International Search Report and Written Opinion dated Jan. 28, 2020, issued in counterpart International application No. PCT/JP2019/044476, with English translation. (20 pages).
(Continued)

*Primary Examiner* — Igor Kershteyn
(74) *Attorney, Agent, or Firm* — WHDA, LLP

(57) ABSTRACT

A rotating machine includes a casing having a hollow shape; a rotator rotatably supported in the casing; a stator blade fixed to an inner peripheral portion of the casing; a rotor blade fixed to an outer peripheral portion of the rotator while being displaced from the stator blade in an axial direction of the rotator; a sealing device disposed between the inner peripheral portion of the casing and a tip of the rotor blade; a swirling flow generation chamber provided along a circumferential direction of the rotator on a downstream side of the sealing device in the casing in a fluid flow direction; and
(Continued)

guiding members provided at predetermined intervals in the swirling flow generation chamber in the circumferential direction of the rotator. The guiding members each include a first guiding surface that is inclined in the circumferential direction with respect to the axial direction of the rotator.

13 Claims, 15 Drawing Sheets

(52) U.S. Cl.
CPC ...... *F05D 2220/31* (2013.01); *F05D 2240/12* (2013.01); *F05D 2240/55* (2013.01)

(58) Field of Classification Search
CPC .......... F05D 2220/31; F05D 2240/126; F05D 2240/12; F05D 2240/129; F05D 2240/55; F05D 2250/11; F05D 2250/183; F05D 2250/23
See application file for complete search history.

(56) References Cited

U.S. PATENT DOCUMENTS

| | | | |
|---|---|---|---|
| 2013/0149124 A1 | 6/2013 | Kuwamura et al. | |
| 2014/0119901 A1 | 5/2014 | Shibata et al. | |
| 2014/0314579 A1* | 10/2014 | Kuwamura | F01D 11/001 416/223 R |
| 2015/0132114 A1 | 5/2015 | Fukushima et al. | |
| 2016/0047265 A1 | 2/2016 | Matsumoto et al. | |
| 2016/0130965 A1* | 5/2016 | Yamaguchi | F01D 11/02 415/13 |
| 2017/0016342 A1 | 1/2017 | Shibata et al. | |
| 2018/0010466 A1 | 1/2018 | Senoo et al. | |
| 2022/0120188 A1* | 4/2022 | Duan | F16J 15/447 |
| 2022/0127968 A1* | 4/2022 | Ono | F01D 25/14 |

FOREIGN PATENT DOCUMENTS

| | | |
|---|---|---|
| CN | 107587898 A | 1/2018 |
| EP | 2096262 A1 | 9/2009 |
| JP | S57-8302 A | 1/1982 |
| JP | H09-317696 A | 12/1997 |
| JP | 2004-11553 A | 1/2004 |
| JP | 2007-321721 A | 12/2007 |
| JP | 2009-47043 A | 3/2009 |
| JP | 2014-234714 A | 12/2014 |
| JP | 2015-94220 A | 5/2015 |
| JP | 5985351 B2 | 9/2016 |
| JP | 2016-194306 A | 11/2016 |

OTHER PUBLICATIONS

Office Action dated Nov. 18, 2022, issued in counterpart to CN Application No. 201980089210.3, with English Translation. (14 pages).

* cited by examiner

ROTATING MACHINE

FIELD

The present invention relates to a rotating machine where a sealing device for suppressing leakage of fluid is disposed between a stationary side and a rotation side.

BACKGROUND

For example, a steam turbine has a structure in which a rotor is rotatably supported by a bearing in a casing and a plurality of stages of rotor blades are fixed to the rotor, and on the other hand, a plurality of stages of stator blades are fixed to the casing between the respective stages of rotor blades. When the steam is supplied from a supply port of the casing, the steam passes through the rotor blades and the stator blades so as to drive and rotate the rotor through the respective stages of rotor blades, and then, the steam is discharged from a discharge port.

In such a steam turbine, in order to suppress the leakage and flow of the steam in an axial direction between the casing and a tip of the rotor blade, a sealing device is provided between the casing and the tip of the rotor blade. This sealing device is usually a labyrinth seal. A labyrinth seal is formed by a plurality of seal fins provided on the tip of the rotor blade or an inner surface of the casing. By forming a gap between the seal fins and the inner surface of the casing or the tip of the rotor blade, the pressure ratio before and after each seal fin is reduced so that the leakage flow rate is suppressed.

The flow of the steam leaking from the sealing device joins the mainstream of the steam passing through the rotor blades or the stator blades. The mainstream of the steam passing through the rotor blades is the flow along the axial direction of the rotor, and the flow of the steam leaking from the sealing device without passing through the rotor blades is inclined from an inner circumferential surface of the casing toward the rotor and swirled in a circumferential direction of the rotor by the stator blades. In this case, it is important to make the flow of the steam leaking from the sealing device smoothly join the mainstream of the steam so as to reduce the mixing loss at this joining portion and suppress the decrease in performance. One example of such a technique is described in Patent Literature 1 below.

CITATION LIST

Patent Literature

Patent Literature 1: Japanese Patent No. 5985351

SUMMARY

Technical Problem

In the axial flow turbine according to Patent Literature 1 described above, a swirling flow adjustment chamber is provided on the downstream side of the seal fin, and in this swirling flow adjustment chamber, a plurality of shielding plates extending in the axial direction and the radial direction of the rotor are fixed. Therefore, in the flow of the steam swirling in the circumferential direction that leaks from the sealing device without passing through the rotor blades, the velocity component in the circumferential direction is reduced by the shielding plates and therefore, the flow of the steam leaking from the sealing device can smoothly join the mainstream of the steam. In the conventional axial flow turbine, however, the shielding plate has a plate shape extending in the axial direction and the radial direction of the rotor; therefore, when the flow of the steam along the circumferential direction collides with the shielding plate, a separation vortex may be generated in a connection portion of the shielding plate and pressure loss may occur.

The present invention has been made in order to solve the above problem, and an object is to provide a rotating machine for improving the performance by reducing the mixing loss at the joining portion in a manner that the fluid leaking from the sealing device joins smoothly the mainstream of the fluid.

Solution to Problem

In order to achieve the object, a rotating machine according to the present invention includes a casing having a hollow shape; a rotator rotatably supported in the casing; a stator blade fixed to an inner peripheral portion of the casing; a rotor blade fixed to an outer peripheral portion of the rotator while being displaced from the stator blade in an axial direction of the rotator; a sealing device disposed between the inner peripheral portion of the casing and a tip of the rotor blade; a swirling flow generation chamber provided along a circumferential direction of the rotator on a downstream side of the sealing device in the casing in a fluid flow direction; and a plurality of guiding members provided at predetermined intervals in the swirling flow generation chamber in the circumferential direction of the rotator. The guiding members each include a first guiding surface that is inclined in the circumferential direction with respect to the axial direction of the rotator.

Therefore, when the fluid is supplied into the casing, the mainstream of the fluid passes through the stator blades and the rotor blades, thereby rotating the rotor blades; on the other hand, a part of the fluid flows between the casing and the tip of the rotor blades after passing through the stator blades. However, the sealing device functions to suppress the leakage of the fluid. In this case, the sealing device leaks a part of the fluid and this leakage fluid swirls in the swirling flow generation chamber and then joins the mainstream of the fluid having passed through the stator blades and the rotor blades. Here, since the leakage fluid leaking from the sealing device passes through the stator blades but does not pass through the rotor blades, the leakage fluid has the velocity component in the circumferential direction. The guiding members provided in the swirling flow generation chamber includes the first guiding surface that is inclined in the circumferential direction with respect to the axial direction of the rotator. Therefore, the leakage fluid with the velocity component in the circumferential direction swirls in the radial direction after the first guiding surface of the guiding member reduces the velocity component in the circumferential direction, and then joins the mainstream of the fluid. In addition, since the first guiding surface is inclined, when the leakage fluid with the velocity component in the circumferential direction collides with this first guiding surface, the separation vortex at the connection portion of the guiding member in the swirling flow generation chamber is reduced and the occurrence of the pressure loss is suppressed. As a result, by making the fluid leaking from the sealing device smoothly join the mainstream of the fluid, the mixing loss at the joining portion can be reduced and the performance can be improved.

In the rotating machine according to the present invention, the first guiding surface is provided along a swirling direction of fluid leaking from the sealing device.

Therefore, since the first guiding surface is provided along the swirling direction of the fluid leaking from the sealing device, the leakage fluid with the velocity component in the circumferential direction is smoothly guided along the first guiding surface.

Accordingly, the separation vortex in the swirling flow generation chamber is reduced and the occurrence of the pressure loss can be suppressed.

In the rotating machine according to the present invention, an end portion of the first guiding surface on the downstream side in the fluid flow direction is inclined to a downstream side in the rotational direction of the rotator with respect to the axial direction of the rotator.

Therefore, since the end portion of the first guiding surface on the downstream side in the fluid flow direction is inclined to the downstream side in the rotational direction of the rotator, the leakage fluid with the velocity component in the circumferential direction is smoothly guided along the first guiding surface.

Accordingly, the separation vortex in the swirling flow generation chamber is reduced and the occurrence of the pressure loss can be suppressed.

In the rotating machine according to the present invention, the guiding members each include an extension portion extending from the swirling flow generation chamber to an upstream side in the fluid flow direction, and the first guiding surface is formed on a surface of the extension portion on a downstream side in the rotational direction of the rotator.

Therefore, since the first guiding surface is formed on the surface of the extension portion on the downstream side in the rotational direction of the rotator, the leakage fluid with the velocity component in the circumferential direction is smoothly guided along the first guiding surface. Accordingly, the separation vortex in the swirling flow generation chamber is reduced and the occurrence of the pressure loss can be suppressed.

In the rotating machine according to the present invention, the first guiding surface includes a base end surface extending from the casing side to the upstream side in the fluid flow direction, and a front end surface curved from the base end surface to the upstream side in the fluid flow direction and an upstream side in the rotational direction of the rotator.

Therefore, since the base end surface extending to the upstream side in the fluid flow direction and the front end surface curved to the upstream side in the rotational direction of the rotator are provided as the first guiding surface, when the leakage fluid with the velocity component in the circumferential direction is smoothly guided along the curved front end surface, the velocity component in the circumferential direction is reduced, and then, when the leakage fluid is guided to the base end surface along the fluid flow direction, the leakage fluid whose velocity component in the circumferential direction is reduced can be discharged properly from the swirling flow generation chamber.

In the rotating machine according to the present invention, the first guiding surface includes a base end surface extending from the casing side to the upstream side in the fluid flow direction and the downstream side in the rotational direction of the rotator, and a front end surface curved from the base end surface to the upstream side in the fluid flow direction and an upstream side in the rotational direction of the rotator.

Therefore, since the base end surface extending to the upstream side in the fluid flow direction and the downstream side in the rotational direction of the rotator and the front end surface curved to the upstream side in the rotational direction of the rotator are provided as the first guiding surface, when the leakage fluid with the velocity component in the circumferential direction is smoothly guided along the curved front end surface, the velocity component in the circumferential direction is reduced, and then, when the leakage fluid is guided to the base end surface extending to the downstream side in the rotational direction, the leakage fluid whose velocity component in the circumferential direction is reduced can be discharged properly from the swirling flow generation chamber.

In the rotating machine according to the present invention, an end portion of the extension portion on the upstream side in the fluid flow direction has a curved shape.

Therefore, since the end portion of the extension portion has the curved shape, the separation when the leakage fluid with the velocity component in the circumferential direction collides with the extension portion can be suppressed, and accordingly, by guiding the leakage fluid smoothly to the first guiding surface, the velocity component in the circumferential direction can be reduced.

In the rotating machine according to the present invention, the sealing device includes a seal fin extending from one of the inner peripheral portion of the casing and the tip of the rotor blade to the other and forming a gap, an inclination angle between the first guiding surface and the axial direction of the rotator is largest at a position facing the gap on the downstream side in the fluid flow direction, and the inclination angle becomes smaller to an outside and an inside in a radial direction of the rotator.

Therefore, since the inclination angle at the first guiding surface is the largest at the position facing the gap on the downstream side in the fluid flow direction, and the inclination angle becomes smaller to the outside and the inside, the velocity component in the circumferential direction of the leakage fluid with the velocity component in the circumferential direction is reduced when the leakage fluid collides with the first guiding surface at the position where the inclination angle is the largest, and then when the leakage fluid is guided at the position where the inclination angle is the smallest, the leakage fluid whose velocity component in the circumferential direction is reduced can be discharged properly from the swirling flow generation chamber.

In the rotating machine according to the present invention, a length of the interval between the guiding members that are adjacent in the circumferential direction of the rotator is smallest at the position facing the gap on the downstream side in the fluid flow direction and becomes larger to the outside and the inside in the radial direction of the rotator.

Therefore, since the length of the interval between the guiding members that are adjacent in the circumferential direction of the rotator is the smallest at the position corresponding to the gap and becomes larger to the outside and the inside, the velocity component in the circumferential direction of the leakage fluid with the velocity component in the circumferential direction is reduced when the leakage fluid collides with the position where the interval between the guiding members is the smallest, and then when the leakage fluid is guided at the position where the interval between the guiding members is the largest, the velocity of the leakage fluid whose velocity component in the circumferential direction is reduced in the swirling flow generation chamber can be reduced and the swirling flow with the proper velocity can be generated.

In the rotating machine according to the present invention, a length of the interval between the guiding members that are adjacent in the circumferential direction of the rotator is largest at the position facing the gap on the downstream side in the fluid flow direction and becomes smaller to the outside and the inside in the radial direction of the rotator.

Therefore, since the length of the interval between the guiding members that are adjacent in the circumferential direction of the rotator is the largest at the position corresponding to the gap and becomes smaller to the outside and the inside, the velocity component in the circumferential direction of the leakage fluid with the velocity component in the circumferential direction is reduced when the leakage fluid collides with the position where the interval between the guiding members is the largest, and then when the leakage fluid is guided at the position where the interval between the guiding members is the smallest, the velocity of the leakage fluid whose velocity component in the circumferential direction is reduced in the swirling flow generation chamber can be increased and the swirling flow with the proper velocity can be generated.

In the rotating machine according to the present invention, the guiding members each include a second guiding surface on a surface on an upstream side in the rotational direction of the rotator, and an end portion of the second guiding surface on the downstream side in the fluid flow direction is inclined to a downstream side in the rotational direction of the rotator with respect to the axial direction of the rotator.

Therefore, since the second guiding surface is formed on the surface on the upstream side in the rotational direction of the rotator and the end portion of the second guiding surface on the downstream side in the fluid flow direction is inclined to the downstream side in the rotational direction of the rotator, the leakage fluid with the velocity component in the circumferential direction is guided smoothly along the second guiding surface and accordingly, the separation vortex in the swirling flow generation chamber is reduced and the occurrence of the pressure loss can be suppressed.

In the rotating machine according to the present invention, the guiding members each include a second guiding surface on a surface on an upstream side in the rotational direction of the rotator, and an end portion of the second guiding surface on the downstream side in the fluid flow direction is inclined to the upstream side in the rotational direction of the rotator with respect to the axial direction of the rotator.

Therefore, since the second guiding surface is formed on the surface on the upstream side in the rotational direction of the rotator and the end portion of the second guiding surface on the downstream side in the fluid flow direction is inclined to the upstream side in the rotational direction of the rotator, the leakage fluid with the velocity component in the circumferential direction is guided smoothly along the second guiding surface and accordingly, the separation vortex in the swirling flow generation chamber is reduced and the occurrence of the pressure loss can be suppressed.

In the rotating machine according to the present invention, the swirling flow generation chamber includes an inner circumferential surface of the casing, a first wall surface facing the sealing device in the casing on the downstream side in the fluid flow direction, and a second wall surface facing the inner circumferential surface of the casing on an inside in the radial direction of the rotator, and the guiding members are fixed to the inner circumferential surface of the casing, the first wall surface, and the second wall surface.

Therefore, since the swirling flow generation chamber is formed by the inner circumferential surface of the casing, the first wall surface, and the second wall surface and the guiding member is fixed to the inner circumferential surface of the casing, the first wall surface, and the second wall surface, the leakage fluid from the sealing device can generate the swirling flow with the proper shape in the swirling flow generation chamber and can smoothly join the mainstream of the fluid.

Advantageous Effects of Invention

By the rotating machine according to the present invention, by making the fluid leaking from the sealing device smoothly join the mainstream of the fluid, the mixing loss at the joining portion can be reduced and the performance can be improved.

DESCRIPTION OF EMBODIMENTS

Preferred embodiments of a rotating machine according to the present invention are hereinafter described in detail with reference to the attached drawings. Note that the embodiments do not limit the present invention and in a case where there are a plurality of embodiments, the embodiments may be combined.

First Embodiment

Figure 4:
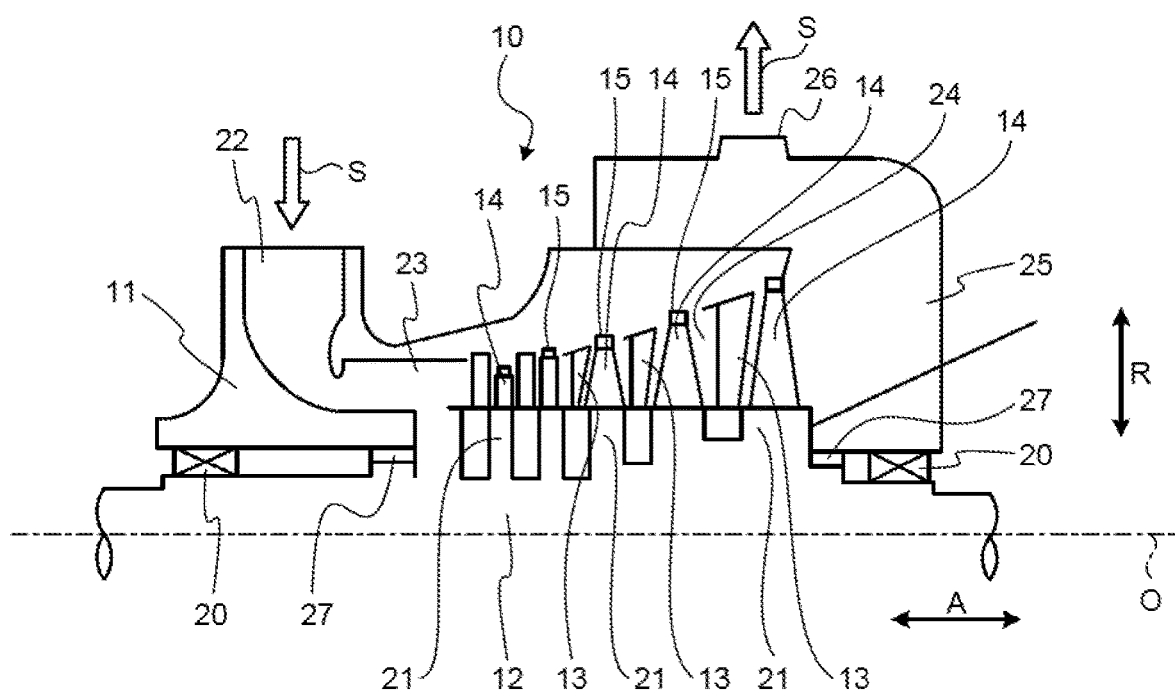
FIG. 4 is a schematic view illustrating the steam turbine according to the first embodiment.

FIG. 4 is a schematic view illustrating a steam turbine according to the present embodiment. In the following description, the axial direction of a rotor is expressed as A, the radial direction of the rotor is expressed as R, and the circumferential direction of the rotor is expressed as C.

In the example of the present embodiment, the rotating machine according to the present invention is a steam turbine. As illustrated in FIG. 4, a steam turbine 10 includes a casing 11, a rotor (rotator) 12, stator blades 13, rotor blades 14, and sealing devices 15.

The casing 11 has a hollow shape, and the rotor 12 is disposed inside the casing 11 along a horizontal direction. The rotor 12 is supported rotatably by a bearing 20 provided to the casing 11 using a center axis O as a center. The stator blades 13 are fixed to an inner peripheral portion of the casing 11 at predetermined intervals in the axial direction A of the rotor 12. A plurality of rotor discs 21 are fixed to an outer peripheral portion of the rotor 12 at predetermined intervals in the axial direction A, and the rotor blades 14 are fixed to an outer peripheral portion of each rotor disc 21. The stator blades 13 and the rotor blades 14 are disposed along the radial direction R of the rotor 12 at predetermined intervals in the circumferential direction of the rotor 12, and disposed alternately along the axial direction A of the rotor 12.

The casing 11 includes a steam inlet 22 on one end portion side thereof in the axial direction A. The steam inlet 22 communicates with a blade cascade part 24 where the stator blades 13 and the rotor blades 14 are arranged through a steam passage 23. This blade cascade part 24 communicates with a steam discharge port 26 through an exhaust hood 25.

In addition, the rotor 12 includes a seal member 27 between each end portion thereof in the axial direction A and the casing 11. Each seal member 27 is disposed more internally than each bearing 20, that is, on the stator blade 13 and rotor blade 14 side. Furthermore, the sealing device 15 is provided between a tip of the rotor blade 14 on the outside in the radial direction R and the inner peripheral portion of the casing 11.

Therefore, after steam S is supplied from the steam inlet 22 to the blade cascade part 24 through the steam passage 23, this steam S passes through the stator blades 13 and the rotor blades 14 and accordingly, the rotor 12 is driven and rotated through the rotor blades 14, so that a power generator, which is not illustrated, connected to this rotor 12 is driven. After that, the steam S that has driven the rotor blades 14 is discharged from the steam discharge port 26 through the exhaust hood 25.

Figure 1:
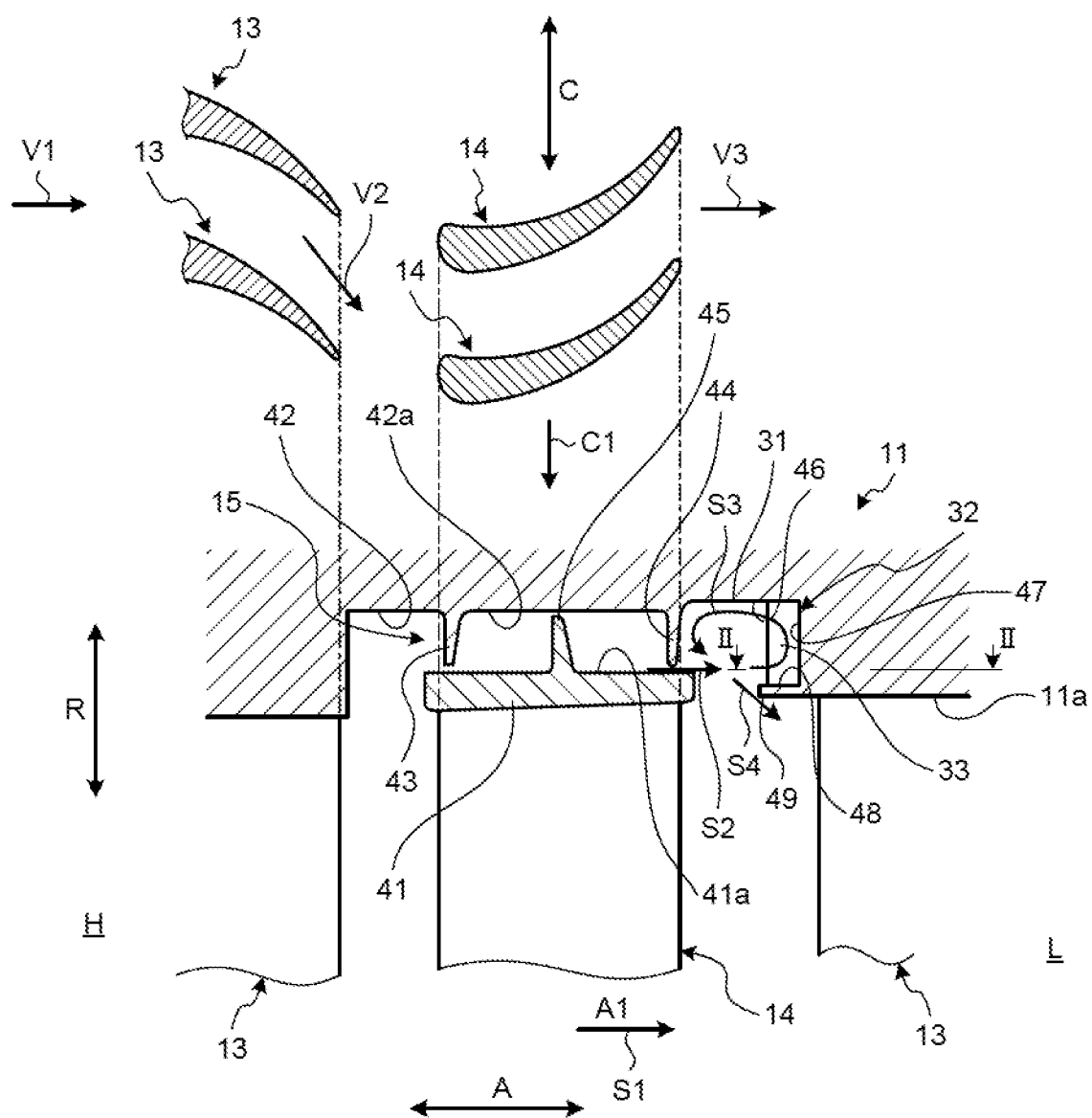
FIG. 1 is a cross-sectional view of a main part for describing the flow of steam in a steam turbine as a rotating machine according to a first embodiment.

Here, the relation among the casing 11, the stator blades 13, the rotor blades 14, and the sealing devices 15 in the aforementioned steam turbine 10 is described in detail. FIG. 1 is a cross-sectional view of a main part for describing the flow of the steam in the steam turbine as the rotating machine according to the first embodiment, and FIG. 2 is a cross-sectional view taken along II-II in FIG. 1, illustrating the flow of the leakage steam with respect to a guiding member.

Figure 2:
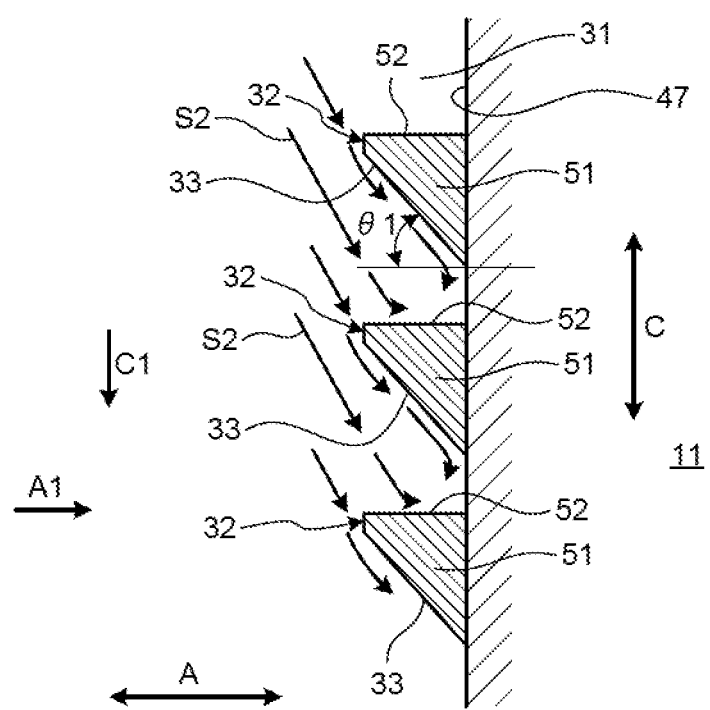
FIG. 2 is a cross-sectional view taken along II-II in FIG. 1, illustrating the flow of leakage steam with respect to a guiding member.

As illustrated in FIG. 1 and FIG. 2, the sealing device 15 is provided between the casing 11 and the tip of the rotor blade 14. The sealing device 15 is to suppress the leakage of the flow of the steam (fluid) S that flows from a high-pressure side H to a low-pressure side L along the axial direction A of the rotor 12 between the casing 11 and the tip of the rotor blade 14. Here, the steam S flows from the high-pressure side H to the low-pressure side L, and mainstream steam S1 flows along a steam flow direction A1 so as to pass through the stator blades 13 and the rotor blades 14. In addition, the mainstream steam S1 having passed through the stator blade 13 partially flows to the sealing device 15 between the casing 11 and the tip of the rotor blade 14, and leakage steam S2 that leaks from the sealing device 15 is generated. This leakage steam S2 passes through the stator blade 13 but does not pass through the rotor blade 14; therefore, the leakage steam S2 has a velocity component in the circumferential direction C.

That is to say, the mainstream steam S1 is the flow in the axial direction A that hardly has the velocity component in the circumferential direction C, and flows with an absolute velocity vector V1 on a leading edge side of the stator blade 13. The mainstream steam S1 is accelerated or turned when passing between the vanes of the stator blades 13, and has an absolute velocity vector V2 with the velocity component in the circumferential direction C, and flows out from a trailing edge side of the stator blade 13. The steam S flowing out from the stator blades 13 mostly collides with the rotor blades 14, so that the rotor 12 together with the rotor blades 14 are rotated at a predetermined rotation velocity in a rotational direction C1. In this case, the steam S is decelerated and turned when passing through the rotor blades 14, and has an absolute velocity vector V3 along the axial direction A that hardly has the velocity component in the circumferential direction C.

On the other hand, the absolute velocity vector V2 of the steam S having passed between the blades of the stator blades 13 has the velocity component in the circumferential direction C, and the leakage steam S2 that leaks from the sealing device 15 without passing through the rotor blades 14 has its velocity changing due to the viscous friction of the side wall or the cover or the acceleration/deceleration of a seal fin, which is described below, but is the flow with the velocity component in the circumferential direction C. Therefore, when the leakage steam S2 joins the mainstream steam S1 with the absolute velocity vector V3 that hardly has the velocity component in the circumferential direction C, the mixing loss occurs at the joining portion.

Here, although the impulse turbine in which the mainstream steam S1 hardly has the velocity component in the circumferential direction C has been described; however, even in a reaction turbine in which the mainstream steam S1 has the velocity component in the circumferential direction C, the mixing loss occurs in the joining portion like the impulse turbine because the mainstream steam S1 and the leakage steam S2 are different in direction vector. The present invention is also applicable to, and still effective in this reaction turbine.

The steam turbine 10 according to the first embodiment includes a swirling flow generation chamber 31 and a plurality of guiding members 32. The swirling flow generation chamber 31 is provided along the circumferential direction C of the rotor 12 on the downstream side of the sealing device 15 in the casing 11 in the steam flow direction A1. The guiding members 32 are provided in the swirling flow generation chamber 31 at predetermined intervals in the circumferential direction C of the rotor 12. In addition, the guiding member 32 has a first guiding surface 33 that is inclined in the circumferential direction C with respect to the axial direction A of the rotor 12.

The stator blades 13 are provided in a manner that a base end portion thereof positioned on the outside in the radial direction R is fixed to the inner peripheral portion of the casing 11, while the rotor blades 14 are provided in a manner that a base end portion thereof positioned on the inside in the radial direction R is fixed to the outer peripheral portion of the rotor 12 (see FIG. 4). The rotor blades 14 are disposed between the stator blades 13 disposed at predetermined intervals in the axial direction A. In the rotor blade 14, a shroud 41 is provided at the tip that is positioned on the outside in the radial direction R. The sealing device 15 is disposed between the inner peripheral portion of the casing 11 and an outer peripheral portion of the shroud 41 in the rotor blade 14.

The casing 11 includes a recessed portion 42 on an inner circumferential surface 11a opposite to the outer peripheral portion of the shroud 41. The recessed portion 42 is an annular groove that is provided along the circumferential direction C of the rotor 12. The shroud 41 of the rotor blade 14 is disposed in the recessed portion 42 of the casing 11. The sealing device 15 includes a plurality of seal fins 43, 44, and 45. The seal fins 43 and 44 are provided in a manner that a base end portion thereof is fixed to an inner circumferential surface 42a of the recessed portion 42 in the casing 11, and a tip thereof extends toward an outer circumferential surface 41a of the shroud 41 of the rotor blade 14. The seal fin 45 is provided between the seal fins 43 and 44 in a manner that a base end portion thereof is fixed to the outer circumferential surface 41a of the shroud 41 of the rotor blade 14 and a tip thereof extends toward the inner circumferential surface 42a of the recessed portion 42 in the casing 11.

The seal fins 43, 44, and 45 are provided at predetermined intervals in the axial direction A of the rotor 12. The seal fins 43, 44, and 45 are provided along the circumferential direction C of the rotor 12. There is a predetermined gap secured between the tip of the seal fins 43 and 44 and the outer circumferential surface 41a of the shroud 41. In addition, there is a predetermined gap secured between the tip of the seal fin 45 and the inner circumferential surface 42a of the recessed portion 42. These predetermined gaps have substantially the same size. Note that the seal fins 43, 44, and 45 may be more than the aforementioned fins or may be attached at other positions.

The recessed portion 42 of the casing 11 is longer than the shroud 41 of the rotor blade 14 in the axial direction A. That is to say, the recessed portion 42 is provided ranging from the upstream side of the leading edge of the rotor blade 14 in the steam flow direction A1 to the downstream side of the trailing edge of the rotor blade 14 in the steam flow direction A1. The swirling flow generation chamber 31 is provided on the downstream side of the trailing edge of the rotor blade 14 in the steam flow direction A1 in the recessed portion 42. The swirling flow generation chamber 31 includes an inner circumferential surface 46 of the casing 11 (recessed portion 42), a first wall surface 47 facing the sealing device 15 in the casing 11 on the downstream side in the steam flow direction A1, and a second wall surface 48 facing the inner side of the inner circumferential surface 11a of the casing 11 in the radial direction R of the rotor 12 (see FIG. 4).

That is to say, the inner circumferential surface 46 exists on the outside of the inner circumferential surface 42a of the recessed portion 42 in the radial direction R, and continues along the circumferential direction C. The first wall surface 47 is a surface parallel to the radial direction R and orthogonal to the inner circumferential surface 46, and continues along the circumferential direction C. The casing 11 includes a protrusion 49 extending to the upstream side (recessed portion 42 side) in the steam flow direction A1 from the inner circumferential surface 11a of the casing 11 on the downstream side of the steam flow direction A1 in the recessed portion 42. The second wall surface 48 is provided on the outside of the protrusion 49 in the radial direction R, is parallel to the inner circumferential surface 46 and orthogonal to the first wall surface 47, and continues along the circumferential direction C.

The guiding member 32 is fixed to the inner circumferential surface 46, the first wall surface 47, and the second wall surface 48. The first guiding surface 33 provided to the guiding member 32 is provided along the swirling direction of the leakage steam S2 that leaks from the sealing device 15. An end portion of the first guiding surface 33 on the downstream side in the steam flow direction A1 is inclined to the downstream side in the rotational direction C1 with respect to the axial direction A.

The guiding member 32 includes a solid or hollow extension portion 51 extending from the first wall surface 47 of the swirling flow generation chamber 31 to the upstream side in the steam flow direction A1. The first guiding surface 33 is formed on a surface of the extension portion 51 on the downstream side in the rotational direction C1. The guiding member 32 includes a second guiding surface 52 on a surface thereof on the upstream side in the rotational direction C1. The second guiding surface 52 is provided along the axial direction A.

That is to say, the guiding member 32 includes the extension portion 51 extending from the first wall surface 47 to the upstream side in the steam flow direction A1. The extension portion 51 is provided along the radial direction R, and has one end portion in the radial direction R fixed to the inner circumferential surface 46 and the other end portion fixed to the second guiding surface 52. The extension portion 51 has a cross-sectional shape that is like a right angled triangle (see FIG. 2), includes the first guiding surface 33 along the radial direction R on the downstream side in the rotational direction C1, and includes the second guiding surface 52 along the radial direction R on the upstream side in the rotational direction C1. The end portion of the first guiding surface 33 on the downstream side in the steam flow direction A1 is inclined by a predetermined inclination angle θ1 to the downstream side in the rotational direction C1 with respect to the axial direction A, and also inclined by a predetermined inclination angle with respect to the first wall surface 47.

This predetermined inclination angle θ1 is set in accordance with the angle where the leakage steam S2 with the velocity component in the circumferential direction C enters with respect to the guiding member 32. The angle where the leakage steam S2 with the velocity component in the circumferential direction C enters is set in accordance with the shape of the stator blade 13. The predetermined inclination angle θ1 is greater than 0° and less than 90°, and is preferably in the range of 30° to 50°. The second guiding surface 52 is parallel to the axial direction A and is perpendicular to the first wall surface 47.

Therefore, when the steam S is supplied into the casing 11 and the rotor blades 14 are rotated, the steam S flows along the steam flow direction A1 from the high-pressure side H to the low-pressure side L. Here, the steam S flows so that the mainstream steam S1 passes through the stator blades 13 and the rotor blades 14 and a part of the steam S flows to the sealing device 15 provided between the casing 11 and the tip of the rotor blade 14 without passing through the rotor blades 14. This sealing device 15 suppresses the leakage of the steam S; however, the steam S partially leaks and the leakage steam S2 is generated. The leakage steam S2 leaking from the sealing device 15 is swirled in the swirling flow generation chamber 31 and joins the mainstream steam S1 having passed through the stator blade 13 and the rotor blade 14.

Here, the leakage steam S2 leaking from the sealing device 15 passes through the stator blade 13 but does not pass through the rotor blade 14; therefore, the leakage steam S2 has the velocity component in the circumferential direction C. The leakage steam S2 with the velocity component in the circumferential direction C becomes swirling flow steam S3 with a center axis along the circumferential direction C in the swirling flow generation chamber 31. That is to say, the leakage steam S2 collides with the first guiding surface 33 and the second guiding surface 52 of the guiding member 32. Then, since the first guiding surface 33 is inclined in the circumferential direction, a part of the leakage steam S2 is guided smoothly to the first guiding surface 33 and another part thereof is guided to the second guiding surface 52. Since the leakage steam S2 is guided to the first guiding surface 33 and the second guiding surface 52, the velocity component in the circumferential direction C is reduced and after that, since the leakage steam S2 is guided to the first wall surface 47, the leakage steam S2 becomes the swirling flow steam S3 that swirls in the swirling flow generation chamber 31 on the inner circumferential surface 46 side.

The swirling flow steam S3 that has swirled in the swirling flow generation chamber 31 passes between the shroud 41 and the protrusion 49 and as leakage steam S4 whose velocity component in the circumferential direction C is reduced, smoothly joins the mainstream steam S1 having passed through the rotor blade 14. In addition, since the first guiding surface 33 is inclined, the angle between the first guiding surface 33 and the first wall surface 47 is obtuse. Therefore, when the leakage steam S2 with the velocity component in the circumferential direction C collides with the first guiding surface 33, after the velocity component in the circumferential direction C is reduced, the leakage steam S2 is guided to the first guiding surface 33 and the first wall surface 47 and becomes the swirling flow steam S3; however, the separation vortex at the connection portion between the first guiding surface 33 and the first wall surface 47 is reduced and the occurrence of pressure loss here is suppressed.

Figure 3:
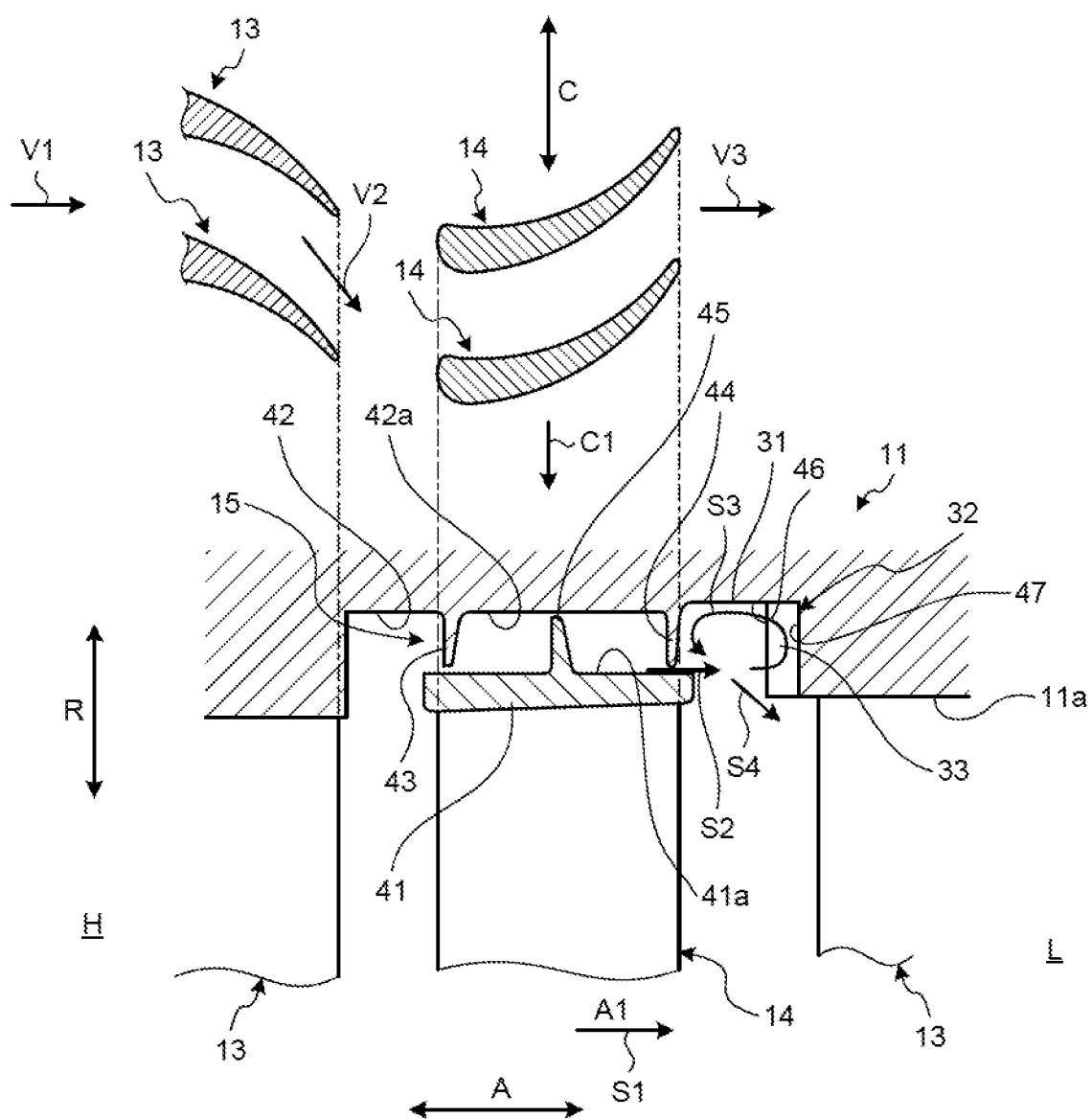
FIG. 3 is a cross-sectional view of a main part of a steam turbine, illustrating a modification of the first embodiment.

In the aforementioned description, the guiding member 32 is fixed to the inner circumferential surface 46, the first wall surface 47, and the second wall surface 48; however, the structure is not limited to this example. FIG. 3 is a cross-sectional view of a main part of a steam turbine, illustrating a modification of the first embodiment.

In a modification of the rotating machine according to the first embodiment, the swirling flow generation chamber 31 is provided on the downstream side of the trailing edge of the rotor blade 14 in the recessed portion 42 in the steam flow direction A1 as illustrated in FIG. 3. The swirling flow generation chamber 31 includes the inner circumferential surface 46 of the casing 11 (recessed portion 42), and the first wall surface 47 facing the sealing device 15 in the casing 11 on the downstream side in the steam flow direction A1. In this modification, neither the protrusion 49 nor the second wall surface 48 (both are illustrated in FIG. 1) is provided.

Therefore, the leakage steam S2 with the velocity component in the circumferential direction C becomes the swirling flow steam S3 in the swirling flow generation chamber 31. That is to say, the leakage steam S2 collides with the first guiding surface 33 and the second guiding surface 52 of the guiding member 32. Then, since the first guiding surface 33 is inclined in the circumferential direction, a part of the swirling flow steam S3 is guided smoothly to the first guiding surface 33 and another part thereof is guided to the second guiding surface 52. Since the leakage steam S2 is guided to the first guiding surface 33 and the second guiding surface 52, the velocity component in the circumferential direction C is reduced and after that, since the leakage steam S2 is guided to the first wall surface 47, the leakage steam S2 becomes the swirling flow steam S3 that swirls in the swirling flow generation chamber 31 on the inner circumferential surface 46 side. The swirling flow steam S3 having swirled in the swirling flow generation chamber 31 passes between the shroud 41 and the inner circumferential surface 11a of the casing 11, and as the leakage steam S4 whose velocity component in the circumferential direction C is reduced, smoothly joins the mainstream steam S1 having passed through the rotor blade 14.

The rotating machine according to the first embodiment includes the casing 11 having a hollow shape, the rotor 12 rotatably supported in the casing 11, the stator blades 13 fixed to the inner peripheral portion of the casing 11, the rotor blades 14 fixed to the outer peripheral portion of the rotor 12 while being displaced from the stator blades 13 in the axial direction A of the rotor 12, the sealing devices 15 each disposed between the inner peripheral portion of the casing 11 and the tip of the rotor blade 14, the swirling flow generation chamber 31 provided along the circumferential direction C of the rotor 12 on the downstream side of the sealing device 15 in the casing 11 in the steam flow direction A1, and the guiding members 32 provided in the swirling flow generation chamber 31 at the predetermined intervals in the circumferential direction C of the rotor 12. The guiding member 32 includes the first guiding surface 33 that is inclined in the circumferential direction C with respect to the axial direction A of the rotor 12.

Therefore, the leakage steam S2 with the velocity component in the circumferential direction C becomes the swirling flow steam S3 whose velocity component in the circumferential direction C is reduced by the first guiding surface 33 of the guiding member 32 and can join the mainstream steam S1. Since the first guiding surface 33 is inclined, when the leakage steam S2 with the velocity component in the circumferential direction C is guided to the first guiding surface 33, the separation vortex at the connection portion of the guiding member 32 in the swirling flow generation chamber 31 is reduced and the occurrence of pressure loss is suppressed. As a result, by making the leakage steam S2 (S5) leaking from the sealing device 15 join the mainstream steam S1 smoothly, the mixing loss at the joining portion can be reduced and the performance can be improved.

In the rotating machine according to the first embodiment, the first guiding surface 33 is provided along the swirling direction of the steam S leaking from the sealing device 15. Therefore, the leakage steam S2 with the velocity component in the circumferential direction C is guided smoothly along the first guiding surface 33 and the separation vortex in the swirling flow generation chamber 31 is reduced and the occurrence of pressure loss can be suppressed.

In the rotating machine according to the first embodiment, the end portion of the first guiding surface 33 on the downstream side in the steam flow direction A1 is inclined to the downstream side in the rotational direction C1 of the rotor 12 with respect to the axial direction A of the rotor 12. Therefore, the leakage steam S2 with the velocity component in the circumferential direction C is guided smoothly along the first guiding surface 33 and the separation vortex in the swirling flow generation chamber 31 is reduced and the occurrence of pressure loss can be suppressed.

In the rotating machine according to the first embodiment, the guiding member 32 includes the extension portion 51 extending from the swirling flow generation chamber 31 to the upstream side in the steam flow direction A1 and the first guiding surface 33 is formed on a surface of the extension portion 51 on the downstream side in the rotational direction C1 of the rotor 12. Therefore, the leakage steam S2 with the velocity component in the circumferential direction C is guided smoothly along the first guiding surface 33, and thus, the separation vortex in the swirling flow generation chamber 31 is reduced and the occurrence of pressure loss can be suppressed.

In the rotating machine according to the first embodiment, the swirling flow generation chamber 31 includes the inner circumferential surface 46 of the casing 11, the first wall surface 47 facing the sealing device 15 in the casing 11 on the downstream side in the steam flow direction A1, and the second wall surface 48 facing the inner circumferential surface 46 of the casing 11 on the inside in the radial direction R of the rotor 12. The guiding member 32 is fixed to the inner circumferential surface 46 of the casing 11, the first wall surface 47, and the second wall surface 48. Therefore, the leakage steam S2 from the sealing device 15 can generate the swirling flow with a proper shape in the swirling flow generation chamber 31 and can smoothly join the mainstream steam S1.

Second Embodiment

Figure 5:
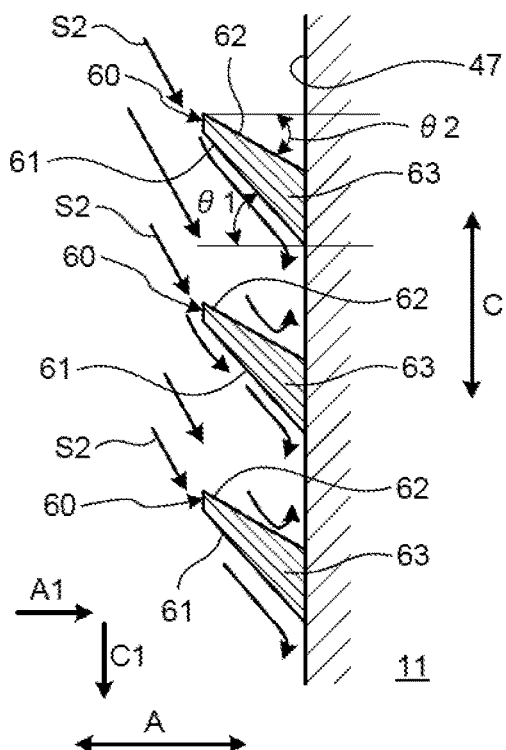
FIG. 5 is a cross-sectional view illustrating the flow of the leakage steam with respect to a guiding member according to a second embodiment.

FIG. 5 is a cross-sectional view illustrating the flow of the leakage steam with respect to a guiding member according to a second embodiment. Note that the basic structure of the second embodiment is similar to that of the aforementioned first embodiment, and is described using FIG. 1. The member with the function similar to that in the aforementioned first embodiment is denoted by the same reference symbol and the detailed description is omitted.

In the second embodiment, as illustrated in FIG. 1 and FIG. 5, the steam turbine 10 includes the casing 11, the rotor 12, the stator blades 13, the rotor blades 14, the sealing devices 15, the swirling flow generation chamber 31, and a plurality of guiding members 60. The swirling flow generation chamber 31 is similar to that in the first embodiment. The guiding members 60 are provided in the swirling flow generation chamber 31 at predetermined intervals in the circumferential direction C of the rotor 12. In addition, the guiding member 60 includes a first guiding surface 61 and a second guiding surface 62 that are inclined in the circumferential direction C with respect to the axial direction A of the rotor 12.

The guiding member 60 is fixed to the inner circumferential surface 46, the first wall surface 47, and the second wall surface 48. The first guiding surface 61 is provided along the swirling direction of the leakage steam S2 leaking from the sealing device 16. The guiding member 60 includes a solid or hollow extension portion 63 extending from the first wall surface 47 of the swirling flow generation chamber 31 to the upstream side in the steam flow direction A1. The first guiding surface 61 is formed on a surface of the extension portion 63 on the downstream side in the rotational direction C1. An end portion of the first guiding surface 61 on the downstream side in the steam flow direction A1 is inclined to the downstream side in the rotational direction C1 with respect to the axial direction A.

On the other hand, the second guiding surface 62 is formed on a surface of the extension portion 63 on the upstream side in the rotational direction C1. An end portion of the second guiding surface 62 on the downstream side in the steam flow direction A1 is inclined to the downstream side in the rotational direction C1 of the rotor 12 with respect to the axial direction A of the rotor 12.

The end portion of the first guiding surface 61 on the downstream side in the steam flow direction A1 is inclined by the predetermined inclination angle $\theta 1$ to the downstream side in the rotational direction C1 with respect to the axial direction A, and is also inclined at a predetermined inclination angle with respect to the first wall surface 47. On the other hand, the end portion of the second guiding surface 62 on the downstream side in the steam flow direction A1 is inclined by a predetermined inclination angle $\theta 2$ to the downstream side in the rotational direction C1 with respect to the axial direction A, and is also inclined at a predetermined inclination angle with respect to the first wall surface 47. The predetermined inclination angle $\theta 1$ is larger than the predetermined inclination angle $\theta 2$. The predetermined inclination angle $\theta 1$ and the predetermined inclination angle $\theta 2$ are set in accordance with the angle where the leakage steam S2 with the velocity component in the circumferential direction C enters with respect to the guiding member 60.

Therefore, the leakage steam S2 leaking from the sealing device 15 becomes the swirling flow steam S3 with the center axis along the circumferential direction C in the swirling flow generation chamber 31. That is to say, the leakage steam S2 collides with the first guiding surface 61 and the second guiding surface 62 of the guiding member 60. Then, the first guiding surface 61 and the second guiding surface 62 are inclined in the circumferential direction and accordingly, the leakage steam S2 is guided smoothly to the first guiding surface 61 and the second guiding surface 62.

Since the leakage steam S2 is guided to the first guiding surface 61 and the second guiding surface 62, the velocity component in the circumferential direction C is reduced and after that, since the leakage steam S2 is guided to the first wall surface 47, the leakage steam S2 becomes the swirling flow steam S3 that swirls in the swirling flow generation chamber 31 on the inner circumferential surface 46 side.

The swirling flow steam S3 that has swirled in the swirling flow generation chamber 31 becomes the leakage steam S4 whose velocity component in the circumferential direction C is reduced, and smoothly joins the mainstream steam S1 having passed through the rotor blade 14. In addition, since the first guiding surface 61 is inclined, the angle between the first guiding surface 61 and the first wall surface 47 is obtuse. Therefore, when the leakage steam S2 with the velocity component in the circumferential direction C collides with the first guiding surface 61, after the velocity component in the circumferential direction C is reduced, the leakage steam S2 is guided to the first guiding surface 61 and the first wall surface 47 and becomes the swirling flow steam S3; however, the separation vortex at the connection portion between the first guiding surface 61 and the first wall surface 47 is reduced and the occurrence of pressure loss here is suppressed. In addition, since the second guiding surface 62 is inclined, when the leakage steam S2 with the velocity component in the circumferential direction C collides with the second guiding surface 62, the velocity component in the circumferential direction C is reduced. Then, since the swirling flow steam S3 guided by the first guiding surface 61 and the first wall surface 47 and the swirling flow steam S3 guided by the second guiding surface 62 and the first wall surface 47 join as appropriate, the swirling flow steam S3 whose velocity component in the circumferential direction C is reduced can be obtained.

In the rotating machine according to the second embodiment, the guiding member includes the second guiding surface 62 on the surface on the upstream side in the rotational direction C1 of the rotor 12, and the end portion of the second guiding surface 62 on the downstream side in the steam flow direction A1 is inclined to the downstream side in the rotational direction C1 of the rotor 12 with respect to the axial direction A of the rotor 12.

Therefore, since the leakage steam S2 with the velocity component in the circumferential direction C is smoothly guided along the second guiding surface 62, the separation vortex in the swirling flow generation chamber 31 is reduced and the occurrence of pressure loss can be suppressed.

Third Embodiment

Figure 6:
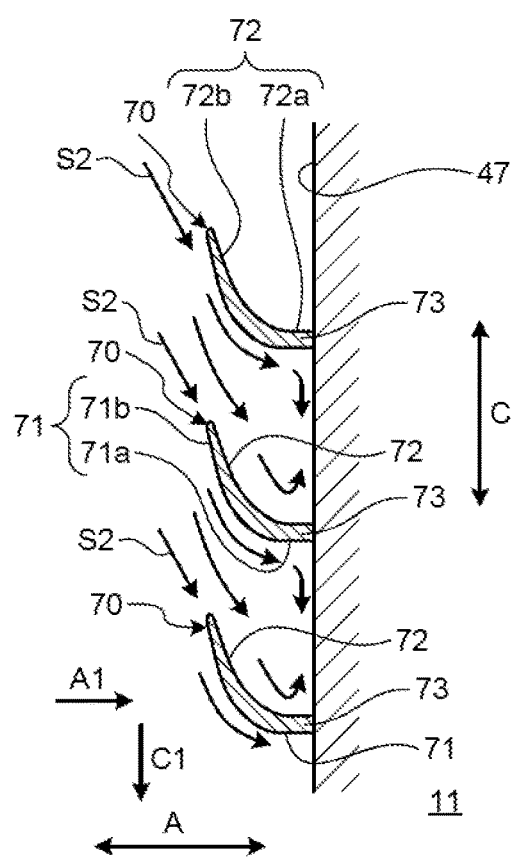
FIG. 6 is a cross-sectional view illustrating the flow of the leakage steam with respect to a guiding member according to a third embodiment.

FIG. 6 is a cross-sectional view illustrating the flow of the leakage steam with respect to a guiding member according to a third embodiment. Note that the basic structure of the third embodiment is similar to that of the aforementioned first embodiment, and is described using FIG. 1. The member with the function similar to that in the aforementioned first embodiment is denoted by the same reference symbol and the detailed description is omitted.

In the third embodiment, as illustrated in FIG. 1 and FIG. 6, the steam turbine 10 includes the casing 11, the rotor 12, the stator blades 13, the rotor blades 14, the sealing devices 15, the swirling flow generation chamber 31, and a plurality of guiding members 70. The swirling flow generation chamber 31 is similar to that in the first embodiment. The guiding members 70 are provided in the swirling flow generation chamber 31 at predetermined intervals in the circumferential direction C of the rotor 12. In addition, the guiding member 70 includes a first guiding surface 71 and a second guiding surface 72 that are inclined in the circumferential direction C with respect to the axial direction A of the rotor 12.

The guiding member 70 is fixed to the inner circumferential surface 46, the first wall surface 47, and the second wall surface 48. The first guiding surface 71 is provided along the swirling direction of the leakage steam S2 leaking from the sealing device 16. The guiding member 70 includes an extension portion 73 extending from the first wall surface 47 of the swirling flow generation chamber 31 to the upstream side in the steam flow direction A1. The first guiding surface 71 is formed on a surface of the extension portion 73 on the downstream side in the rotational direction C1. An end portion of the first guiding surface 71 on the downstream side in the steam flow direction A1 is inclined to the downstream side in the rotational direction C1 with respect to the axial direction A.

On the other hand, the second guiding surface 72 is formed on a surface of the extension portion 73 on the upstream side in the rotational direction C1. An end portion of the second guiding surface 72 on the downstream side in the steam flow direction A1 is inclined to the downstream side in the rotational direction C1 of the rotor 12 with respect to the axial direction A of the rotor 12.

The first guiding surface 71 includes a base end surface 71a extending from the first wall surface 47 of the casing 11 to the upstream side in the steam flow direction A1, and a front end surface 71b curved from this base end surface 71a to the upstream side in the steam flow direction A1 and the upstream side in the rotational direction C1 of the rotor 12. Therefore, the base end surface 71a of the first guiding surface 71 is parallel to the axial direction A, and the front end surface 71b thereof is curved and inclined to the upstream side in the rotational direction C1 with respect to the axial direction A.

On the other hand, the second guiding surface 72 includes a base end surface 72a extending from the first wall surface 47 of the casing 11 to the upstream side in the steam flow direction A1, and a front end surface 72b curved from this base end surface 72a to the upstream side in the steam flow direction A1 and the upstream side in the rotational direction C1 of the rotor 12. Therefore, the base end surface 72a of the second guiding surface 72 is parallel to the axial direction A, and the front end surface 72b thereof is curved and inclined to the upstream side in the rotational direction C1 with respect to the axial direction A. In this case, the extension portion 73 of the guiding member 70 has a plate shape, and the thickness is the same or becomes smaller in the range of the base end portion side to the tip side.

Figure 7:
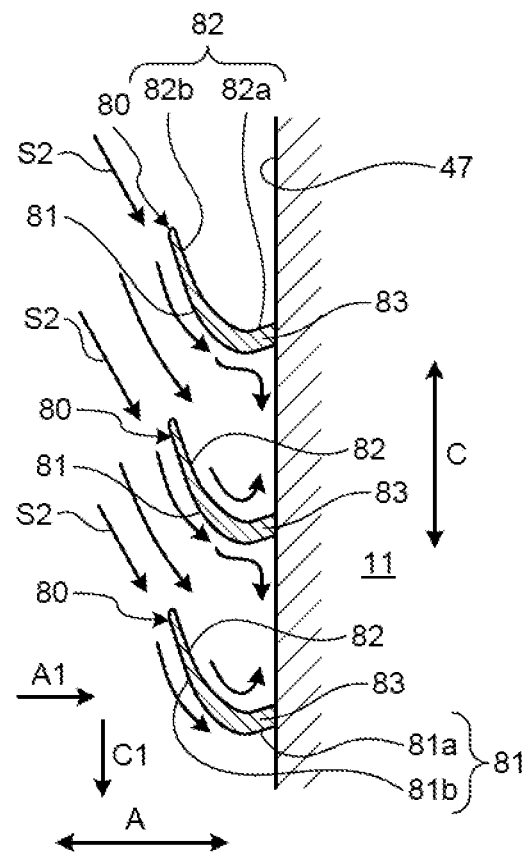
FIG. 7 is a cross-sectional view illustrating the flow of the leakage steam with respect to the guiding member, illustrating a modification of the third embodiment.

Note that the shape of the guiding member 70 is not limited to the aforementioned shape. FIG. 7 is a cross-sectional view illustrating the flow of the leakage steam with respect to the guiding member, illustrating a modification of the third embodiment.

In the modification of the third embodiment, as illustrated in FIG. 1 and FIG. 7, a guiding member 80 includes a first guiding surface 81 and a second guiding surface 82 inclined in the circumferential direction C with respect to the axial direction A of the rotor 12. The guiding member 80 includes an extension portion 83 extending from the first wall surface 47 of the swirling flow generation chamber 31 to the upstream side in the steam flow direction A1. The first guiding surface 81 is formed on a surface of the extension portion 83 on the downstream side in the rotational direction C1. The second guiding surface 82 is formed on a surface of the extension portion 83 on the upstream side in the rotational direction C1.

The first guiding surface 81 includes a base end surface 81a extending from the first wall surface 47 of the casing 11 to the upstream side in the steam flow direction A1 and the downstream side in the rotational direction C1 of the rotor 12, and a front end surface 81b curved from this base end surface 81a to the upstream side in the steam flow direction A1 and the upstream side in the rotational direction C1 of the rotor 12. On the other hand, the second guiding surface 82 includes a base end surface 82a extending from the first wall surface 47 of the casing 11 to the upstream side in the steam flow direction A1 and the downstream side in the rotational direction C1 of the rotor 12, and a front end surface 82b curved from this base end surface 82a to the upstream side in the steam flow direction A1 and the upstream side in the rotational direction C1 of the rotor 12.

In the rotating machine according to the third embodiment, the first guiding surface 71 includes the base end surface 71a extending from the casing 11 side to the upstream side in the steam flow direction A1, and the front end surface 71b curved from this base end surface 71a to the upstream side in the steam flow direction A1 and the upstream side in the rotational direction C1 of the rotor 12.

The leakage steam S2 with the velocity component in the circumferential direction C is guided smoothly along the curved front end surface 71b, so that the velocity component in the circumferential direction C is reduced and after that, the leakage steam S2 is guided to the base end surface 71a along the steam flow direction A1, so that the leakage steam S2 whose velocity component in the circumferential direction C is reduced can be discharged from the swirling flow generation chamber 31 as appropriate.

In the rotating machine according to the third embodiment, the first guiding surface 81 includes the base end surface 81a extending from the casing 11 side to the upstream side in the steam flow direction A1 and the downstream side in the rotational direction C1 of the rotor 12, and the front end surface 81b curved from the base end surface 81a to the upstream side in the steam flow direction A1 and the upstream side in the rotational direction C1 of the rotor 12.

Therefore, since the leakage steam S2 with the velocity component in the circumferential direction C is smoothly guided along the curved front end surface 81b, the velocity component in the circumferential direction C is reduced, and after that, since the leakage steam S2 is guided to the front end surface 81a extending to the downstream side in the rotational direction C1, the leakage steam S2 whose velocity component in the circumferential direction C is reduced can be discharged from the swirling flow generation chamber 31 as appropriate.

Fourth Embodiment

Figure 8:
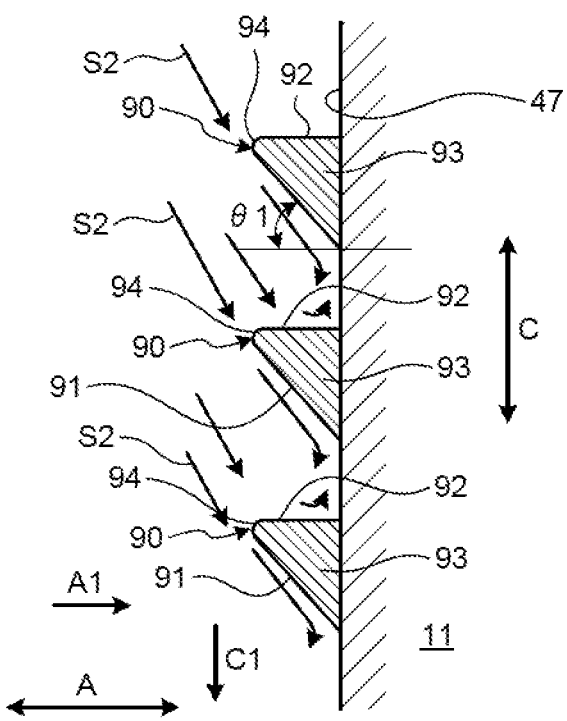
FIG. 8 is a cross-sectional view illustrating the flow of the leakage steam with respect to a guiding member according to a fourth embodiment.

FIG. 8 is a cross-sectional view illustrating the flow of the leakage steam with respect to a guiding member according to a fourth embodiment. Note that the basic structure of the fourth embodiment is similar to that of the aforementioned first embodiment, and is described using FIG. 1. The member with the function similar to that in the aforementioned first embodiment is denoted by the same reference symbol and the detailed description is omitted.

In the fourth embodiment, as illustrated in FIG. 1 and FIG. 8, the steam turbine 10 includes the casing 11, the rotor 12, the stator blades 13, the rotor blades 14, the sealing devices 15, the swirling flow generation chamber 31, and a plurality of guiding members 90. The swirling flow generation chamber 31 is similar to that in the first embodiment.

The guiding members 90 are provided in the swirling flow generation chamber 31 at predetermined intervals in the circumferential direction C of the rotor 12. In addition, the guiding member 90 includes a first guiding surface 91 that is inclined in the circumferential direction C with respect to the axial direction A of the rotor 12 and a second guiding surface 92 that is parallel to the axial direction A of the rotor 12.

The guiding member 90 is fixed to the inner circumferential surface 46, the first wall surface 47, and the second wall surface 48. The first guiding surface 91 is provided along the swirling direction of the leakage steam S2 leaking from the sealing device 16. The guiding member 90 includes a solid or hollow extension portion 93 extending from the first wall surface 47 of the swirling flow generation chamber 31 to the upstream side in the steam flow direction A1. The first guiding surface 91 is formed on a surface of the extension portion 93 on the downstream side in the rotational direction C1. The second guiding surface 92 is formed on a surface of the extension portion 93 on the upstream side in the rotational direction C1.

An end portion of the extension portion 93 on the upstream side in the steam flow direction A1 has a curved shape. That is to say, the extension portion 93 includes a curved portion 94 at a tip where the first guiding surface 91 and the second guiding surface 92 intersect.

Figure 9:
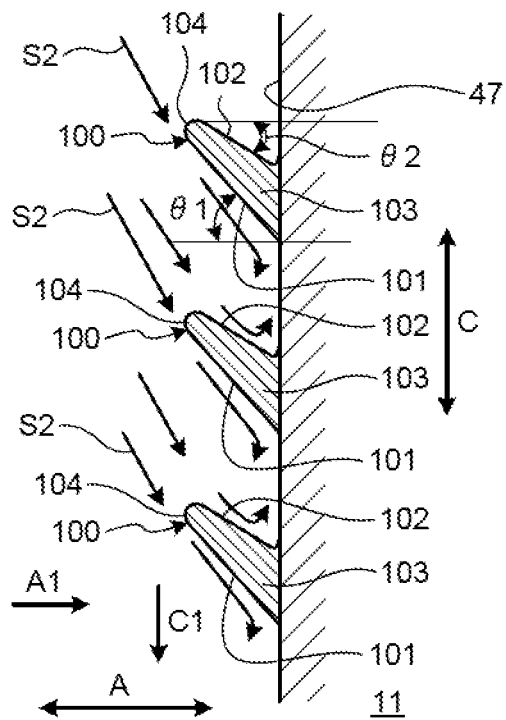
FIG. 9 is a cross-sectional view illustrating the flow of the leakage steam with respect to the guiding member, illustrating a modification of the fourth embodiment.

The shape of the guiding member 90 is not limited to the aforementioned shape. FIG. 9 is a cross-sectional view illustrating the flow of the leakage steam with respect to a guiding member according to a modification of the fourth embodiment.

In the modification of the fourth embodiment, as illustrated in FIG. 1 and FIG. 9, the steam turbine 10 includes the casing 11, the rotor 12, the stator blades 13, the rotor blades 14, the sealing devices 15, the swirling flow generation chamber 31, and a plurality of guiding members 100. The swirling flow generation chamber 31 is similar to that in the first embodiment. The guiding members 100 are provided in the swirling flow generation chamber 31 at predetermined intervals in the circumferential direction C of the rotor 12. In addition, the guiding member 100 includes a first guiding surface 101 and a second guiding surface 102 that are inclined in the circumferential direction C with respect to the axial direction A of the rotor 12.

The guiding member 100 is fixed to the inner circumferential surface 46, the first wall surface 47, and the second wall surface 48. The first guiding surface 101 is provided along the swirling direction of the leakage steam S2 leaking from the sealing device 16. The guiding member 100 includes a solid or hollow extension portion 103 extending from the first wall surface 47 of the swirling flow generation chamber 31 to the upstream side in the steam flow direction A1. The first guiding surface 101 is formed on a surface of the extension portion 103 on the downstream side in the rotational direction C1. The second guiding surface 102 is formed on a surface of the extension portion 103 on the upstream side in the rotational direction C1.

An end portion of the extension portion 103 on the upstream side in the steam flow direction A1 has a curved shape. That is to say, a curved portion 104 is provided at a tip of the extension portion 103 where the first guiding surface 101 and the second guiding surface 102 intersect.

In the rotating machine according to the fourth embodiment, an end portion of each of the extension portions 93 and 103 on the upstream side in the steam flow direction A1 has a curved shape. Therefore, when the leakage steam S2 with the velocity component in the circumferential direction C collides with the extension portions 93 and 103, the leakage steam S2 is guided smoothly to the first guiding surfaces 91 and 101 and the second guiding surfaces 92 and 102 by the curved portions 94 and 104, and the separation here can be suppressed. By smoothly guiding the leakage steam S2 to the first guiding surfaces 91 and 101, the velocity component in the circumferential direction C can be reduced.

Fifth Embodiment

Figure 10:
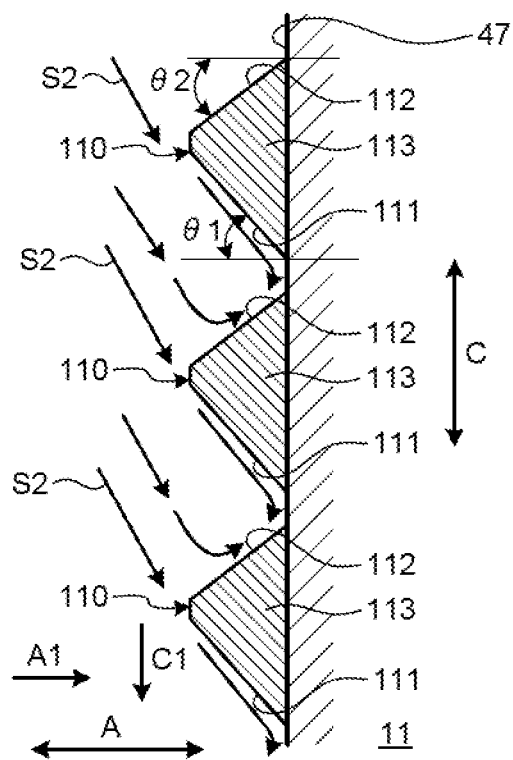
FIG. 10 is a cross-sectional view illustrating the flow of the leakage steam with respect to a guiding member according to a fifth embodiment.

FIG. 10 is a cross-sectional view illustrating the flow of the leakage steam with respect to a guiding member according to a fifth embodiment. Note that the basic structure of the fifth embodiment is similar to that of the aforementioned first embodiment, and is described using FIG. 1. The member with the function similar to that in the aforementioned first embodiment is denoted by the same reference symbol and the detailed description is omitted.

In the fifth embodiment, as illustrated in FIG. 1 and FIG. 10, the steam turbine 10 includes the casing 11, the rotor 12, the stator blades 13, the rotor blades 14, the sealing devices 15, the swirling flow generation chamber 31, and a plurality of guiding members 110. The swirling flow generation chamber 31 is similar to that in the first embodiment. The guiding members 110 are provided in the swirling flow generation chamber 31 at predetermined intervals in the circumferential direction C of the rotor 12. In addition, the guiding member 110 includes a first guiding surface 111 and a second guiding surface 112 that are inclined in the circumferential direction C with respect to the axial direction A of the rotor 12.

The guiding member 110 is fixed to the inner circumferential surface 46, the first wall surface 47, and the second wall surface 48. The first guiding surface 111 is provided along the swirling direction of the leakage steam S2 leaking from the sealing device 16. The guiding member 110 includes a solid or hollow extension portion 113 extending from the first wall surface 47 of the swirling flow generation chamber 31 to the upstream side in the steam flow direction A1. The first guiding surface 111 is formed on a surface of the extension portion 113 on the downstream side in the rotational direction C1. An end portion of the first guiding surface 111 on the downstream side in the steam flow direction A1 is inclined to the downstream side in the rotational direction C1 with respect to the axial direction A. On the other hand, the second guiding surface 112 is formed on a surface of the extension portion 113 on the upstream side in the rotational direction C1. An end portion of the second guiding surface 112 on the downstream side in the steam flow direction A1 is inclined to the upstream side in the rotational direction C1 of the rotor 12 with respect to the axial direction A of the rotor 12.

In the rotating machine according to the fifth embodiment, the guiding member 110 includes the second guiding surface 112 on the surface on the upstream side in the rotational direction C1 of the rotor 12, and the end portion of the second guiding surface 112 on the downstream side in the steam flow direction A1 is inclined to the upstream side in the rotational direction C1 of the rotor 12 with respect to the axial direction A of the rotor 12.

Therefore, the leakage steam S2 with the velocity component in the circumferential direction C is guided smoothly to the second guiding surface 112 and thus, the separation vortex in the swirling flow generation chamber 31 is reduced and the occurrence of pressure loss can be suppressed.

Sixth Embodiment

Figure 11:
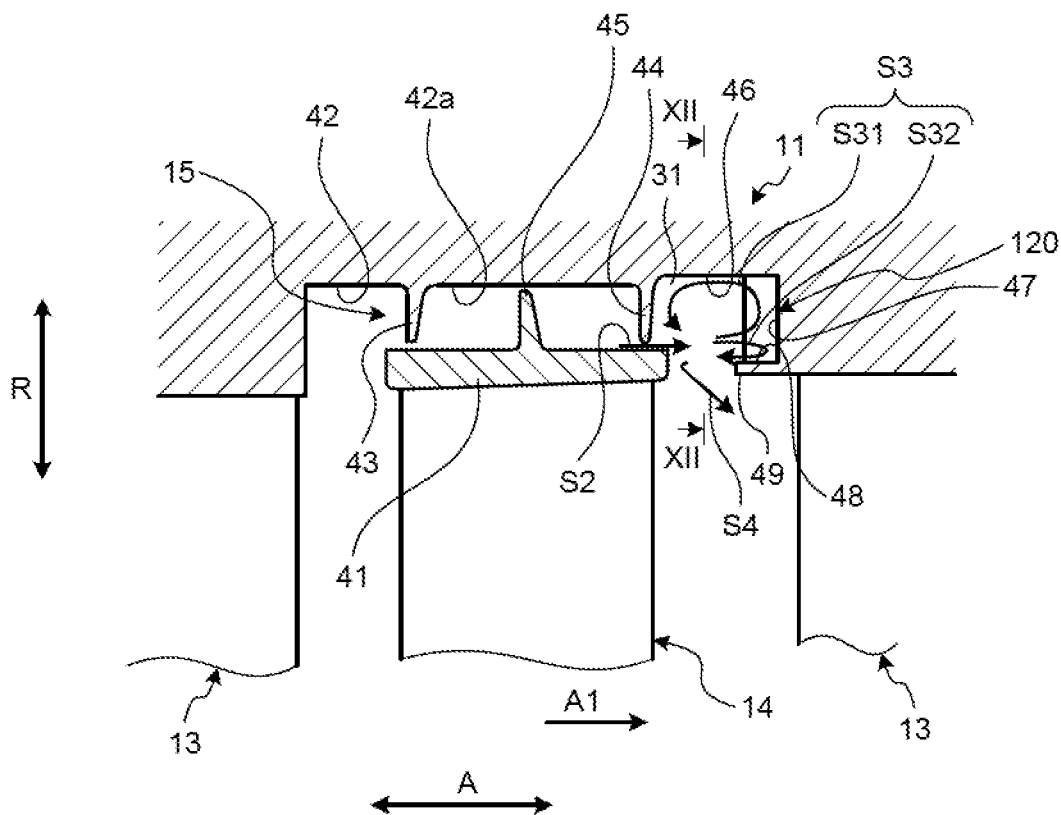
FIG. 11 is a cross-sectional view of a main part for describing the flow of the steam in a steam turbine as a rotating machine according to a sixth embodiment.
Figure 12:
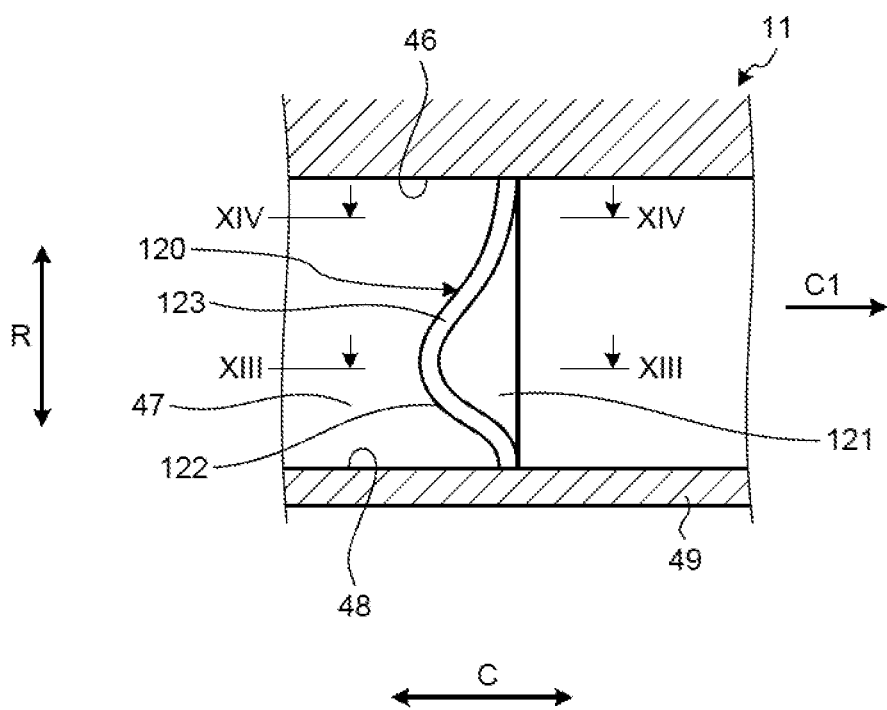
FIG. 12 is a cross-sectional view taken along XII-XII in FIG. 11 for describing the shape of the guiding member.
Figure 13:
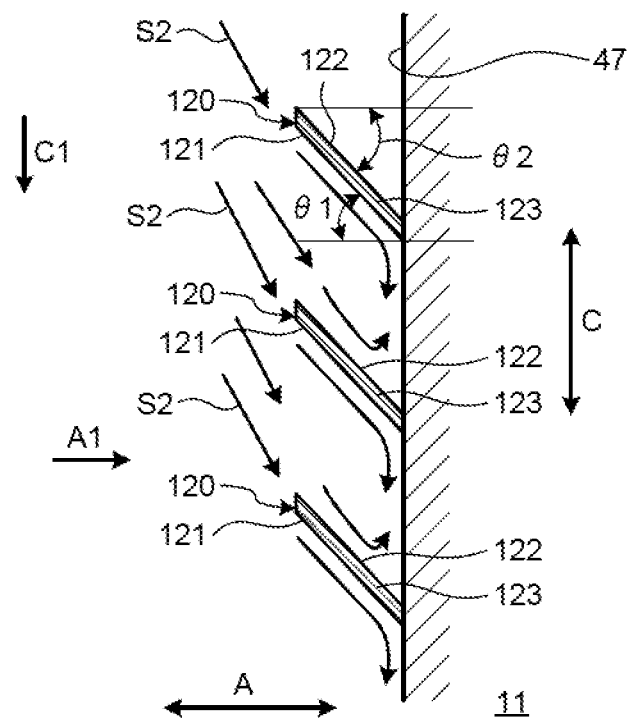
FIG. 13 is a cross-sectional view taken along XIII-XIII in FIG. 12, illustrating the flow of the leakage steam with respect to the guiding member.
Figure 14:
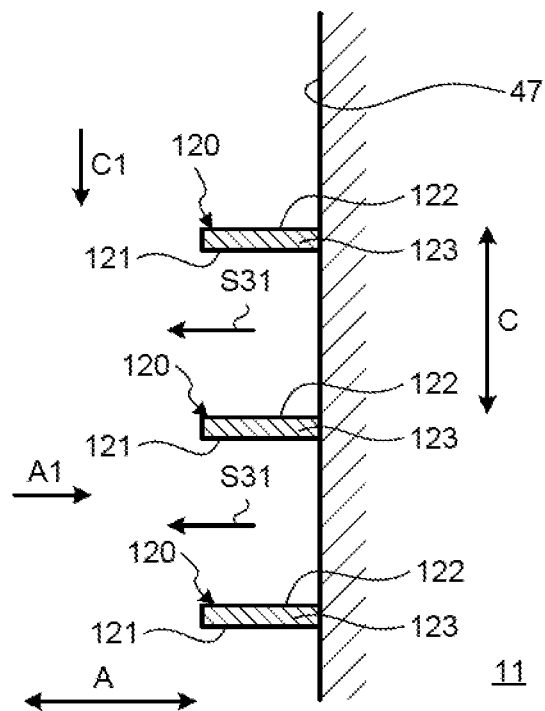
FIG. 14 is a cross-sectional view taken along XIV-XIV in FIG. 12, illustrating the flow of the leakage steam with respect to the guiding member.

FIG. 11 is a cross-sectional view of a main part for describing the flow of the steam in a steam turbine as a rotating machine according to a sixth embodiment, FIG. 12 is a cross-sectional view taken along XII-XII in FIG. 11 for describing the shape of the guiding member, FIG. 13 is a cross-sectional view taken along XIII-XIII in FIG. 12, illustrating the flow of the leakage steam with respect to the guiding member, and FIG. 14 is a cross-sectional view taken along XIV-XIV in FIG. 12, illustrating the flow of the leakage steam with respect to the guiding member. Note that the basic structure of the sixth embodiment is similar to that of the aforementioned first embodiment, and is described using FIG. 1. The member with the function similar to that in the aforementioned first embodiment is denoted by the same reference symbol and the detailed description is omitted.

In the sixth embodiment, as illustrated in FIG. 11 to FIG. 14, the steam turbine 10 includes the casing 11, the rotor 12, the stator blades 13, the rotor blades 14, the sealing devices 15, the swirling flow generation chamber 31, and a plurality of guiding members 120. The guiding members 120 are provided in the swirling flow generation chamber 31 at predetermined intervals in the circumferential direction C of the rotor 12. In addition, the guiding member 120 includes a first guiding surface 121 and a second guiding surface 122 that are inclined in the circumferential direction C with respect to the axial direction A of the rotor 12.

The guiding member 120 is fixed to the inner circumferential surface 46, the first wall surface 47, and the second wall surface 48. The first guiding surface 121 is provided along the swirling direction of the leakage steam S2 leaking from the sealing device 16. The guiding member 120 includes an extension portion 123 with a plate shape extending from the first wall surface 47 of the swirling flow generation chamber 31 to the upstream side in the steam flow direction A1. The first guiding surface 121 is formed on a surface of the extension portion 123 on the downstream side in the rotational direction C1. An end portion of the first guiding surface 121 on the downstream side in the steam flow direction A1 is inclined to the downstream side in the rotational direction C1 with respect to the axial direction A.

On the other hand, the second guiding surface 122 is formed on a surface of the extension portion 123 on the upstream side in the rotational direction C1. An end portion of the second guiding surface 122 on the downstream side in the steam flow direction A1 is inclined to the downstream side in the rotational direction C1 of the rotor 12 with respect to the axial direction A of the rotor 12.

In the sealing device 15, there is a gap secured between the seal fin 44 and the shroud 41 on the most downstream side of the leakage steam S2, and the leakage steam S2 flows into the swirling flow generation chamber 31 through the gap between the seal fin 44 and the shroud 41. The inclination angle $\theta 1$ between the first guiding surface 121 and the axial direction A of the rotor 12 is the largest at the position facing this gap on the downstream side in the steam flow direction A1, and the inclination angle $\theta 1$ becomes smaller to the outside and inside in the radial direction R of the rotor 12.

That is to say, the inclination angle $\theta 1$ of the first guiding surface 121 is the largest at the position facing the gap of the sealing device 15 in the axial direction A. On the other hand, the inclination angle $\theta 1$ of the first guiding surface 121 is the smallest on the outside and inside in the radial direction R of the rotor 12, that is, at the connection position to the inner circumferential surface 46 and the connection position to the second wall surface 48, which is $\theta 1=0°$. The inclination angle $\theta 1$ continuously changes because the position of the first guiding surface 121 facing the gap of the sealing device 15 in the axial direction A, the connection position to the inner circumferential surface 46, and the connection position to the second wall surface 48 continue with the curved surface twisted in the three-dimensional direction. In this case, the guiding member 120 (first guiding surface 121) is parallel to the radial direction R of the rotor 12 at the position where the guiding member 120 is fixed to the first wall surface 47, and has such a shape that the inclination angle θ1 is different in the radial direction R from the position of being fixed to the first wall surface 47 to the front end.

In addition, the extension portion 123 as the guiding member 120 has the same thickness in the axial direction A and the radial direction R of the rotor 12. Therefore, in a manner similar to the first guiding surface 121, the inclination angle θ2 between the second guiding surface 122 and the axial direction A of the rotor 12 is the largest at the position facing the gap of the sealing device 15 on the downstream side in the steam flow direction A1, and the inclination angle θ2 becomes smaller to the outside and inside in the radial direction R of the rotor 12.

The leakage steam S2 leaking from the sealing device 15 becomes the swirling flow steam S3 with the center axis along the circumferential direction C in the swirling flow generation chamber 31. That is to say, the leakage steam S2 collides with the first guiding surface 121 and the second guiding surface 122 of the guiding member 120. Then, since the first guiding surface 121 and the second guiding surface 122 are inclined in the circumferential direction as illustrated in FIG. 11 and FIG. 13, the leakage steam S2 is guided smoothly to the first guiding surface 121 and the second guiding surface 122. Since the leakage steam S2 is guided to the first guiding surface 121 and the second guiding surface 122, the velocity component in the circumferential direction C is reduced and after that, since the leakage steam S2 is guided to the first wall surface 47, the leakage steam S2 becomes the swirling flow steam S3 that swirls in the swirling flow generation chamber 31 on the inner circumferential surface 46 side.

That is to say, the leakage steam S2 leaking from the gap of the sealing device 15 is guided to the first guiding surface 121 and the second guiding surface 122 that are inclined in the circumferential direction, so that the velocity component in the circumferential direction C is reduced. The leakage steam S2 whose velocity component in the circumferential direction C is divided by the swirling flow generation chamber 31 into swirling flow steam S31 that swirls to the outside in the radial direction R of the rotor 12 and swirling flow steam S32 that swirls to the inside in the radial direction R of the rotor 12. The swirling flow steam S31 that swirls to the outside swirls in the swirling flow generation chamber 31 and partially joins the swirling flow steam S32 that swirls on the inside. As illustrated in FIG. 11 and FIG. 14, the swirling flow steam S31 that swirls to the outside and the swirling flow steam S32 that swirls to the inside hardly have the velocity component in the circumferential direction C, and are guided to the first guiding surface 121 and the second guiding surface 122 that are not inclined in the circumferential direction, so that the swirling flow steam S31 is discharged first as appropriate. The swirling flow steam S31 is discharged first and joins to form the swirling flow steam S3. While the swirling flow steam S3 is guided to the end portion of the shroud 41, the swirling flow steam S3 smoothly joins the mainstream steam S1 having passed through the rotor blade 14 as the leakage steam S4.

Figure 15:
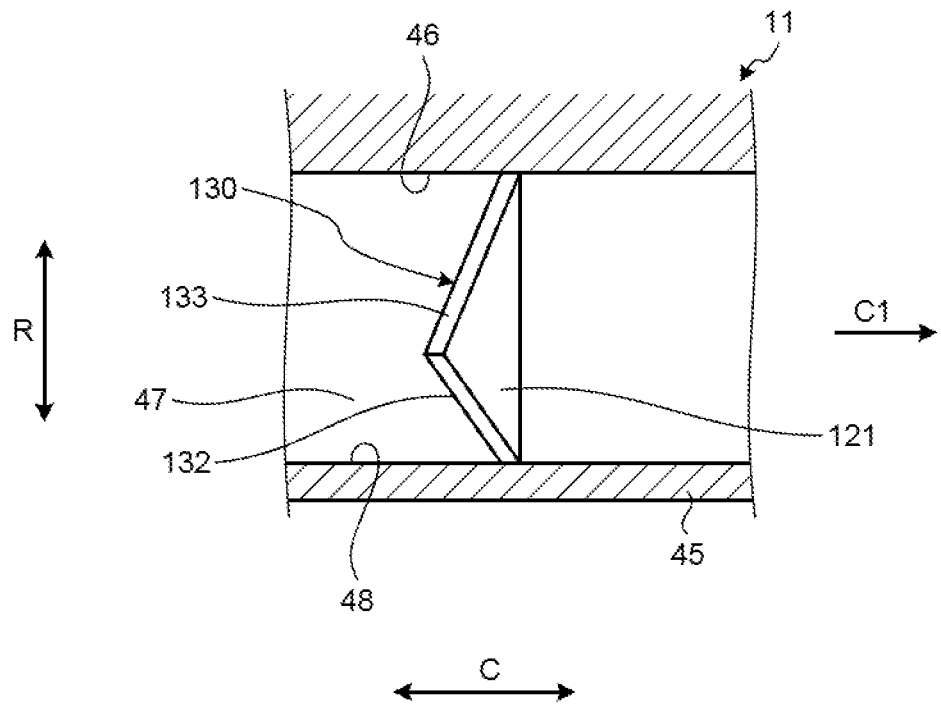
FIG. 15 is a cross-sectional view for describing the shape of a guiding member, illustrating a modification of the sixth embodiment.

Note that the shape of the guiding member 120 is not limited to the aforementioned shape. FIG. 15 is a cross-sectional view for describing the shape of a guiding member expressing a modification of the sixth embodiment.

In the modification of the sixth embodiment, as illustrated in FIG. 11 and FIG. 15, a guiding member 130 includes a first guiding surface 131 and a second guiding surface 132 that are inclined in the circumferential direction C with respect to the axial direction A of the rotor 12. The guiding member 130 is fixed to the inner circumferential surface 46, the first wall surface 47, and the second wall surface 48. The guiding member 130 includes an extension portion 133 with a plate shape extending from the first wall surface 47 of the swirling flow generation chamber 31 to the upstream side in the steam flow direction A1. The first guiding surface 131 is formed on a surface of the extension portion 133 on the downstream side in the rotational direction C1. An end portion of the first guiding surface 131 on the downstream side in the steam flow direction A1 is inclined to the downstream side in the rotational direction C1 with respect to the axial direction A. On the other hand, the second guiding surface 132 is formed on a surface of the extension portion 133 on the upstream side in the rotational direction C1. An end portion of the second guiding surface 132 on the downstream side in the steam flow direction A1 is inclined to the downstream side in the rotational direction C1 of the rotor 12 with respect to the axial direction A of the rotor 12.

The inclination angle θ1 between the first guiding surface 131 and the axial direction A of the rotor 12 is the largest at the position facing the gap of the sealing device 15 on the downstream side in the steam flow direction A1, and the inclination angle θ1 becomes smaller to the outside and inside in the radial direction R of the rotor 12. The inclination angle θ1 of the first guiding surface 131 is the largest at the position facing the gap of the sealing device 15 in the axial direction. On the other hand, the inclination angle θ1 of the first guiding surface 131 is the smallest on the outside and inside in the radial direction R of the rotor 12, that is, at the connection position to the inner circumferential surface 46 and the connection position to the second wall surface 48. The inclination angle θ1 continuously changes because the first guiding surface 131 continues with the curved surface twisted in the three-dimensional direction among the position facing the gap of the sealing device 15 in the axial direction, the connection position to the inner circumferential surface 46, and the connection position to the second wall surface 48. In this case, the guiding member 130 (first guiding surface 131) is parallel to the radial direction R of the rotor 12 at the position where the guiding member 130 is fixed to the first wall surface 47, and has such a shape that the inclination angle θ1 is different in the radial direction R from the position of being fixed to the first wall surface 47 to the front end.

The extension portion 133 as the guiding member 130 has the same thickness in the axial direction A and the radial direction R of the rotor 12. In a manner similar to the first guiding surface 131, the inclination angle θ2 between the second guiding surface 132 and the axial direction A of the rotor 12 is the largest at the position facing the gap of the sealing device 15 on the downstream side in the steam flow direction A1, and the inclination angle θ2 becomes smaller to the outside and inside in the radial direction R of the rotor 12.

In the rotating machine according to the sixth embodiment, the gap is formed between the seal fin 44 and the shroud 41 in the sealing device 15. The inclination angle θ1 between the first guiding surfaces 121 and 131 and the axial direction A of the rotor 12 is the largest at the position facing the gap on the downstream side in the steam flow direction A1, and the inclination angle θ1 becomes smaller to the outside and inside in the radial direction R of the rotor 12.

Therefore, the leakage steam S2 with the velocity component in the circumferential direction C is guided to the position where the inclination angle θ1 is the largest on the first guiding surfaces 121 and 131, and after that, is guided to the position where the inclination angle θ2 is the smallest; accordingly, the leakage steam S2 whose velocity component in the circumferential direction C is reduced in the swirling flow generation chamber 31 can join as appropriate the mainstream steam S1 by the first guiding surfaces 121 and 131.

Seventh Embodiment

Figure 16:
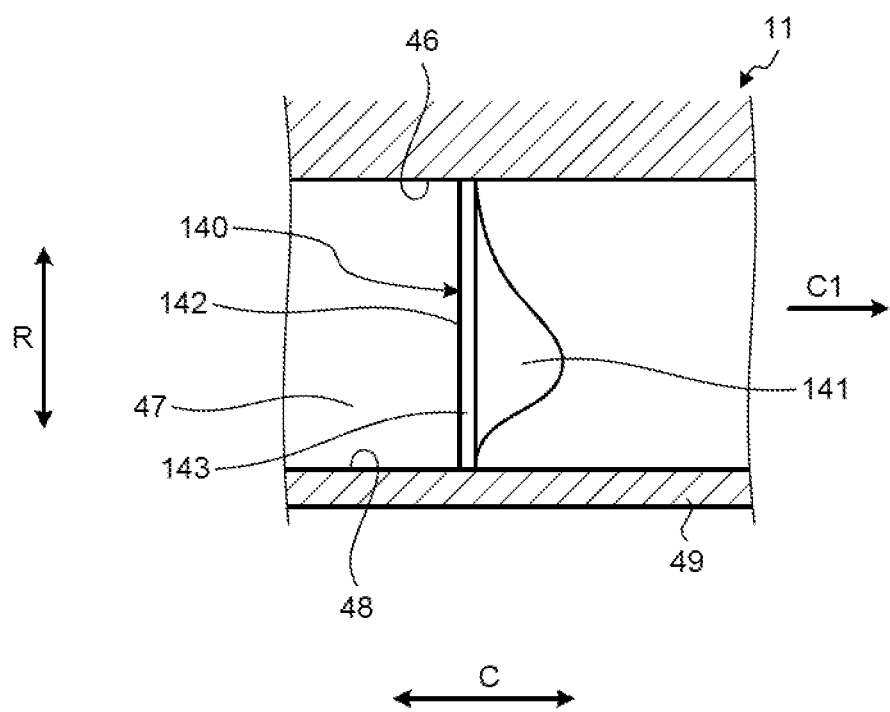
FIG. 16 is a cross-sectional view for describing the shape of a guiding member according to a seventh embodiment.

FIG. 16 is a cross-sectional view for describing the shape of a guiding member according to a seventh embodiment. Note that the basic structure of the seventh embodiment is similar to that of the aforementioned sixth embodiment, and is described using FIG. 11. The member with the function similar to that in the aforementioned sixth embodiment is denoted by the same reference symbol and the detailed description is omitted.

In the seventh embodiment, as illustrated in FIG. 11 and FIG. 16, a guiding member 140 includes a first guiding surface 141 and a second guiding surface 142 that are inclined in the circumferential direction C with respect to the axial direction A of the rotor 12. The guiding member 140 is fixed to the inner circumferential surface 46, the first wall surface 47, and the second wall surface 48. The first guiding surface 141 is provided along the swirling direction of the leakage steam S2 leaking from the sealing device 16. The guiding member 140 includes an extension portion 143 with a plate shape extending from the first wall surface 47 of the swirling flow generation chamber 31 to the upstream side in the steam flow direction A1. The first guiding surface 141 is formed on a surface of the extension portion 143 on the downstream side in the rotational direction C1. On the other hand, the second guiding surface 142 is formed on a surface of the extension portion 143 on the upstream side in the rotational direction C1.

The inclination angle θ1 between the first guiding surface 141 and the axial direction A of the rotor 12 is the largest at the position facing the gap of the sealing device 15 on the downstream side in the steam flow direction A1, and the inclination angle θ1 becomes smaller to the outside and inside in the radial direction R of the rotor 12. The inclination angle θ1 continuously changes because the first guiding surface 121 continues with the curved surface twisted in the three-dimensional direction among the position facing the gap of the sealing device 15 in the axial direction A, the connection position to the inner circumferential surface 46, and the connection position to the second wall surface 48. In this case, the guiding member 140 (first guiding surface 141) is parallel to the radial direction R of the rotor 12 at the position where the guiding member 140 is fixed to the first wall surface 47, and has such a shape that the inclination angle θ1 is different in the radial direction R from the position of being fixed to the first wall surface 47 to the front end.

The extension portion 143 as the guiding member 140 has the same thickness in the axial direction A and the radial direction R of the rotor 12. In a manner similar to the first guiding surface 141, the inclination angle θ2 between the second guiding surface 142 and the axial direction A of the rotor 12 is the largest at the position facing the gap of the sealing device 15 on the downstream side in the steam flow direction A1, and the inclination angle θ2 becomes smaller to the outside and inside in the radial direction R of the rotor 12.

Figure 17:
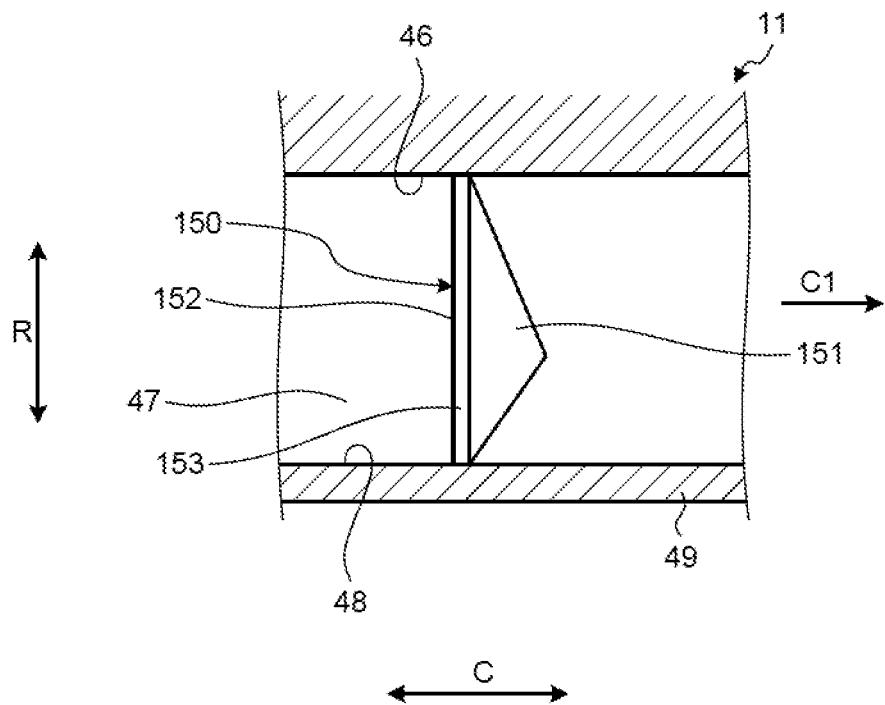
FIG. 17 is a cross-sectional view for describing the shape of a guiding member, illustrating a modification of the seventh embodiment.

Note that the shape of the guiding member 140 is not limited to the aforementioned shape. FIG. 17 is a cross-sectional view for describing the shape of a guiding member according to a modification of the seventh embodiment.

In the modification of the seventh embodiment, as illustrated in FIG. 11 and FIG. 17, a guiding member 150 includes a first guiding surface 151 and a second guiding surface 152 that are inclined in the circumferential direction C with respect to the axial direction A of the rotor 12. The guiding member 150 is fixed to the inner circumferential surface 46, the first wall surface 47, and the second wall surface 48. The guiding member 150 includes an extension portion 153 with a plate shape extending from the first wall surface 47 of the swirling flow generation chamber 31 to the upstream side in the steam flow direction A1. The first guiding surface 151 is formed on a surface of the extension portion 153 on the downstream side in the rotational direction C1. On the other hand, the second guiding surface 152 is formed on a surface of the extension portion 153 on the upstream side in the rotational direction C1.

The inclination angle θ1 between the first guiding surface 151 and the axial direction A of the rotor 12 is the largest at the position facing the gap of the sealing device 15 on the downstream side in the steam flow direction A1, and the inclination angle θ1 becomes smaller to the outside and inside in the radial direction R of the rotor 12. The inclination angle θ1 continuously changes because the second guiding surface 152 continues with the curved surface twisted in the three-dimensional direction among the position facing the gap of the sealing device 15 in the axial direction, the connection position to the inner circumferential surface 46, and the connection position to the second wall surface 48. In this case, the guiding member 150 (first guiding surface 151) is parallel to the radial direction R of the rotor 12 at the front end position, and has such a shape that the inclination angle θ1 is different in the radial direction R from the front end to the position of being fixed to the first wall surface 47.

The extension portion 153 as the guiding member 150 has the same thickness in the axial direction A and the radial direction R of the rotor 12. In a manner similar to the first guiding surface 151, the inclination angle θ2 between the second guiding surface 152 and the axial direction A of the rotor 12 is the largest at the position facing the gap of the sealing device 15 on the downstream side in the steam flow direction A1, and the inclination angle θ2 becomes smaller to the outside and inside in the radial direction R of the rotor 12.

In the rotating machine according to the seventh embodiment, the gap is formed between the seal fin 44 and the shroud 41 in the sealing device 15. The inclination angle θ1 between the first guiding surfaces 141 and 151 and the axial direction A of the rotor 12 is the largest at the position facing the gap on the downstream side in the steam flow direction A1, and the inclination angle θ1 becomes smaller to the outside and inside in the radial direction R of the rotor 12.

Therefore, the leakage steam S2 with the velocity component in the circumferential direction C is guided to the position where the inclination angle θ1 is the largest on the first guiding surfaces 141 and 151, and after that, is guided to the position where the inclination angle θ2 is the smallest; accordingly, the leakage steam S2 whose velocity component in the circumferential direction C is reduced in the swirling flow generation chamber 31 can join as appropriate with the mainstream steam S1 by the first guiding surfaces 141 and 151.

Eighth Embodiment

Figure 18:
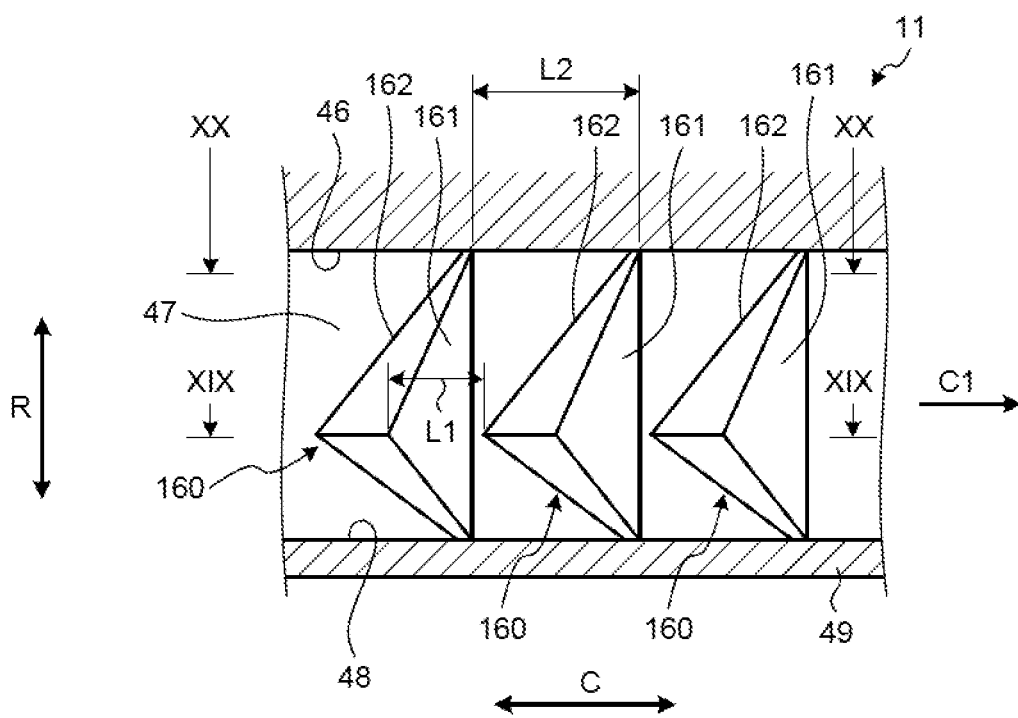
FIG. 18 is a cross-sectional view for describing the shape of a guiding member according to an eight embodiment.
Figure 19:
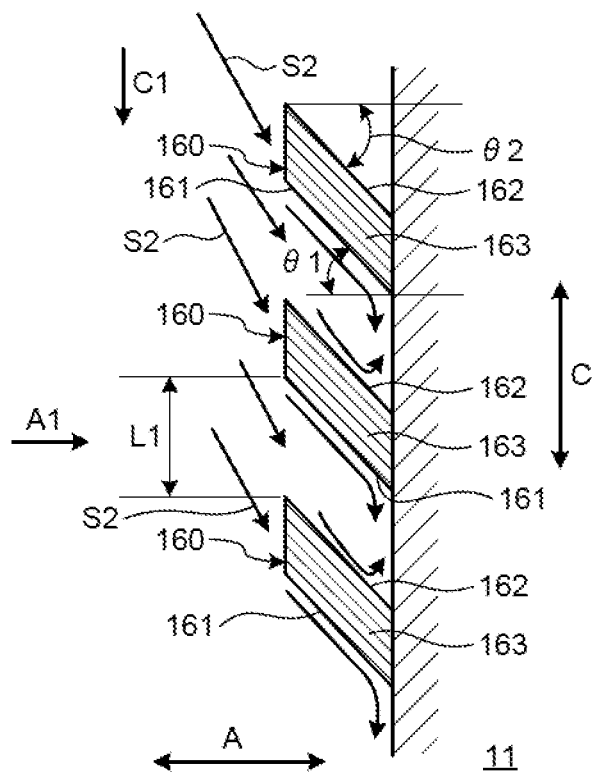
FIG. 19 is a cross-sectional view taken along XIX-XIX in FIG. 18, illustrating the flow of the leakage steam with respect to the guiding member.
Figure 20:
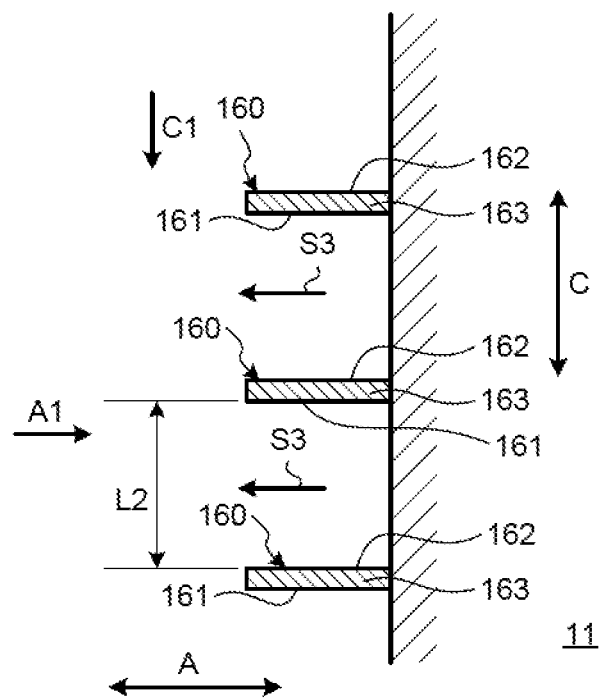
FIG. 20 is a cross-sectional view taken along XX-XX in FIG. 18, illustrating the flow of the leakage steam with respect to the guiding member.

FIG. 18 is a cross-sectional view for describing the shape of a guiding member according to an eight embodiment, FIG. 19 is a cross-sectional view taken along XIX-XIX in FIG. 18, illustrating the flow of the leakage steam with respect to the guiding member, and FIG. 20 is a cross-sectional view taken along XX-XX in FIG. 18, illustrating the flow of the leakage steam with respect to the guiding member. Note that the basic structure of the eighth embodiment is similar to that of the aforementioned sixth embodiment, and is described using FIG. 11. The member with the function similar to that in the aforementioned sixth embodiment is denoted by the same reference symbol and the detailed description is omitted.

In the eighth embodiment, as illustrated in FIG. 11 and FIG. 18 to FIG. 20, a guiding member 160 includes a first guiding surface 161 and a second guiding surface 162 that are inclined in the circumferential direction C with respect to the axial direction A of the rotor 12. The guiding member 160 is fixed to the inner circumferential surface 46, the first wall surface 47, and the second wall surface 48. The first guiding surface 161 is provided along the swirling direction of the leakage steam S2 leaking from the sealing device 16. The guiding member 160 includes an extension portion 163 with a plate shape extending from the first wall surface 47 of the swirling flow generation chamber 31 to the upstream side in the steam flow direction A1. The first guiding surface 161 is formed on a surface of the extension portion 163 on the downstream side in the rotational direction C1. An end portion of the first guiding surface 161 on the downstream side in the steam flow direction A1 is inclined to the downstream side in the rotational direction C1 with respect to the axial direction A.

On the other hand, the second guiding surface 162 is formed on a surface of the extension portion 163 on the upstream side in the rotational direction C1. An end portion of the second guiding surface 162 on the downstream side in the steam flow direction A1 is inclined to the downstream side in the rotational direction C1 of the rotor 12 with respect to the axial direction A of the rotor 12.

The inclination angle θ1 between the first guiding surface 161 and the axial direction A of the rotor 12 is the largest at the position facing the gap of the sealing device 15 on the downstream side in the steam flow direction A1, and the inclination angle θ1 becomes smaller to the outside and inside in the radial direction R of the rotor 12.

That is to say, the inclination angle θ1 of the first guiding surface 161 is the largest at the position facing the gap of the sealing device 15 in the axial direction. On the other hand, the inclination angle θ1 of the first guiding surface 161 is the smallest on the outside and inside in the radial direction R of the rotor 12, that is, at the connection position to the inner circumferential surface 46 and the connection position to the second wall surface 48, which is θ1=0°. The inclination angle θ1 continuously changes because the first guiding surface 161 continues with the curved surface twisted in the three-dimensional direction among the position facing the gap of the sealing device 15 in the axial direction A, the connection position to the inner circumferential surface 46, and the connection position to the second wall surface 48. In this case, the guiding member 160 (first guiding surface 161) is parallel to the radial direction R of the rotor 12 at the position where the guiding member 160 is fixed to the first wall surface 47, and has such a shape that the inclination angle θ1 is different in the radial direction R from the position of being fixed to the first wall surface 47 to the front end.

In addition, in a manner similar to the first guiding surface 161, the inclination angle θ2 between the second guiding surface 162 and the axial direction A of the rotor 12 is the largest at the position facing the gap of the sealing device 15 on the downstream side in the steam flow direction A1, and the inclination angle θ2 becomes smaller to the outside and inside in the radial direction R of the rotor 12.

The thickness of the guiding member 160 in the circumferential direction C of the rotor 12 is the largest at the position facing the gap of the sealing device 15 on the downstream side in the steam flow direction A1, and the thickness of the guiding member 160 in the circumferential direction C of the rotor 12 becomes smaller to the outside and the inside in the radial direction R of the rotor 12. Therefore, the length of the interval between the guiding members 160 that are adjacent in the circumferential direction C of the rotor 12 is the smallest at the position facing the gap on the downstream side in the steam flow direction A1 and becomes larger to the outside and the inside in the radial direction R of the rotor 12. That is to say, the length L1 of the interval between the guiding members 160 that are adjacent at the position facing the gap of the sealing device 15 is smaller than the length L2 of the interval between the guiding members 160 that are adjacent at the connection position to the inner circumferential surface 46 and the connection position to the second wall surface 48. In other words, L1<L2 is satisfied.

The leakage steam S2 leaking from the sealing device 15 becomes the swirling flow steam S3 with the center axis along the circumferential direction C in the swirling flow generation chamber 31. That is to say, the leakage steam S2 collides with the first guiding surface 161 and the second guiding surface 162 of the guiding member 160. Then, since the first guiding surface 161 and the second guiding surface 162 are inclined in the circumferential direction at the intermediate portion in the radial direction R as illustrated in FIG. 18 and FIG. 19, the leakage steam S2 is guided smoothly to the first guiding surface 161 and the second guiding surface 162 and becomes the swirling flow steam S3 whose velocity component in the circumferential direction C is reduced. Here, since neither the first guiding surface 161 nor the second guiding surface 162 is inclined in the circumferential direction on the outside and the inside in the radial direction R as illustrated in FIG. 18 and FIG. 20, the swirling flow steam S3 discharged from the swirling flow generation chamber 31 becomes the leakage steam S4 that hardly has the velocity component in the circumferential direction C and smoothly joins the mainstream steam S1.

Incidentally, the leakage steam S2 leaking from the gap of the sealing device 15 changes in velocity in accordance with the shape of the sealing device 15. On the other hand, the mainstream steam S1 maintains the velocity constant regardless of the shape of the sealing device 15. The velocity of the leakage steam S2 varies depending on the number and the shape of the seal fins 43, 44, and 45, the gap size between the seal fins 43 and 44 and the shroud 41, the gap size between the seal fin 45 and the recessed portion 42, and the like. When the gap size is small, the velocity of the leakage steam S2 becomes fast and when the gap size is large, the velocity of the leakage steam S2 becomes slow. In the present embodiment, the length of the interval between the guiding members 160 that are adjacent in the circumferential direction C of the rotor 12 is the largest on the outside and the inside in the radial direction R of the rotor 12; therefore, when the leakage steam S2 is discharged from the swirling flow generation chamber 31, the flow path, that is, the interval between the guiding members 160 that are adjacent becomes large and the velocity of the leakage steam S2 decreases to become close to the velocity of the mainstream steam S1. Therefore, the leakage steam S4 smoothly joins the mainstream steam S1.

Figure 21:
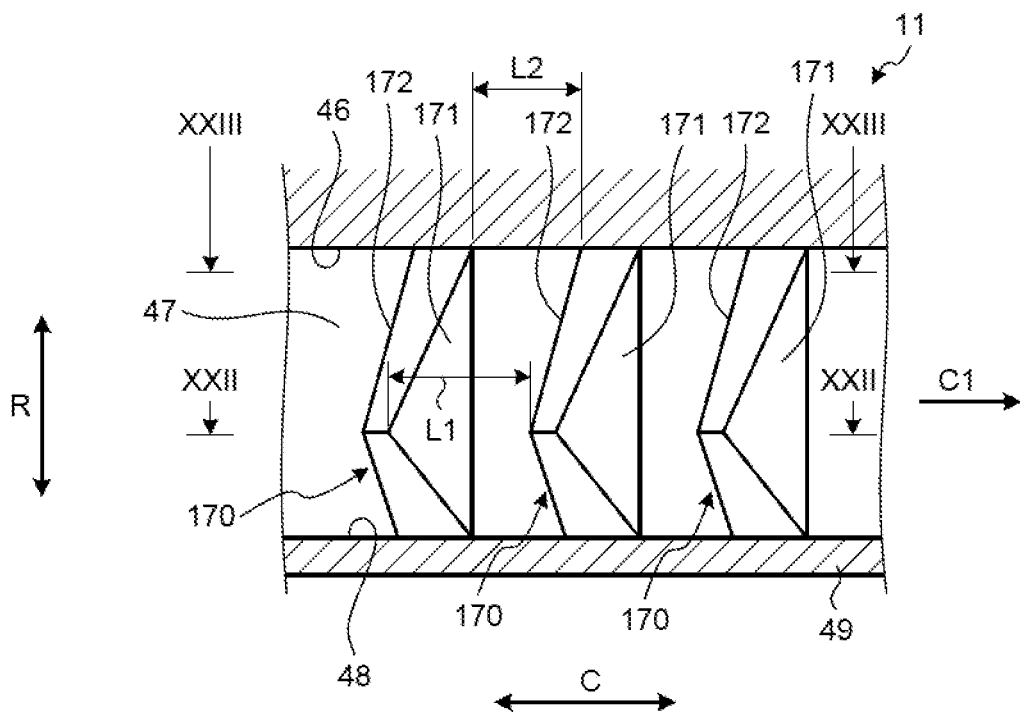
FIG. 21 is a cross-sectional view for describing the shape of a guiding member, illustrating a first modification of the eighth embodiment.
Figure 22:
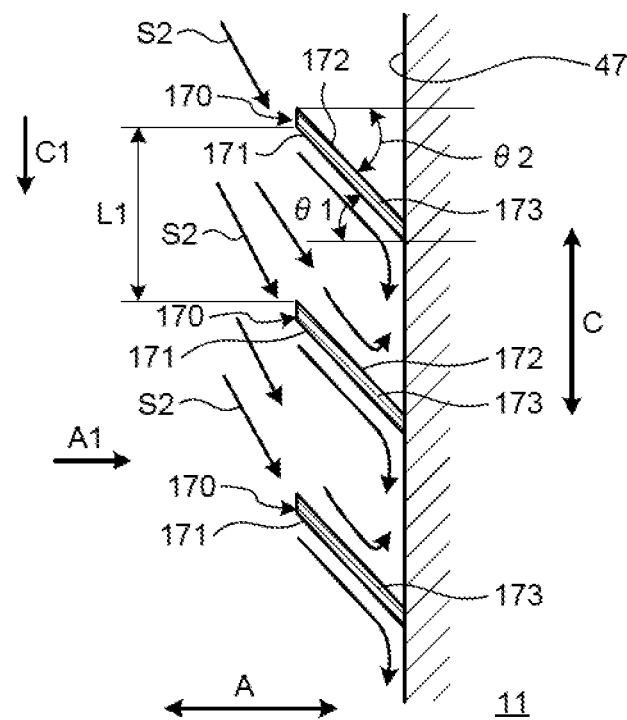
FIG. 22 is a cross-sectional view taken along XXII-XXII in FIG. 21, illustrating the flow of the leakage steam with respect to the guiding member.
Figure 23:
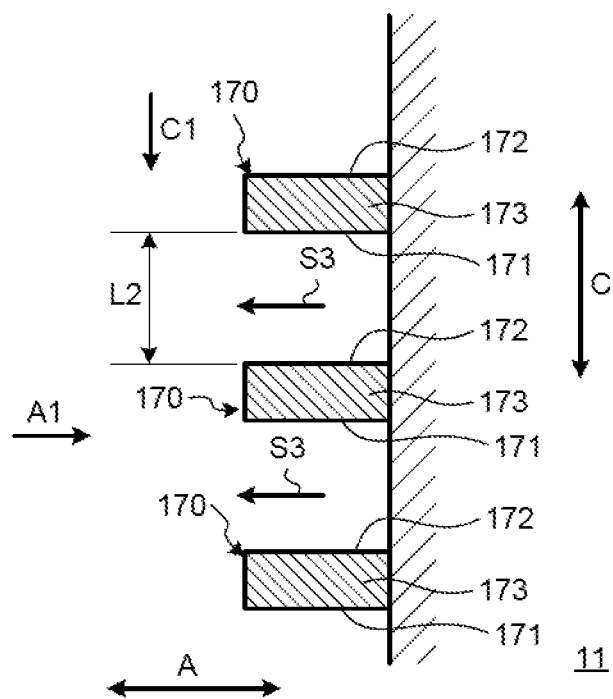
FIG. 23 is a cross-sectional view taken along XXIII-XXIII in FIG. 21, illustrating the flow of the leakage steam with respect to the guiding member.
Figure 24:
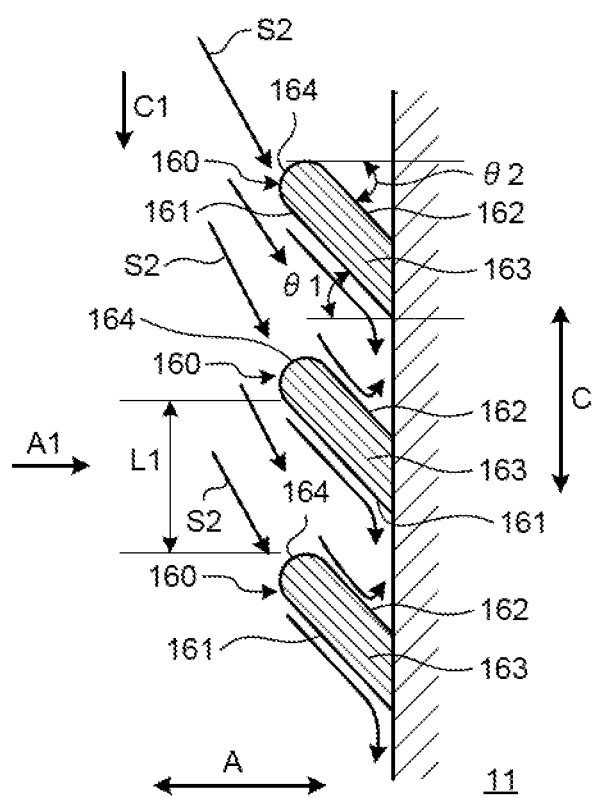
FIG. 24 is a cross-sectional view of a guiding member, illustrating a second modification of the eighth embodiment.
Figure 25:
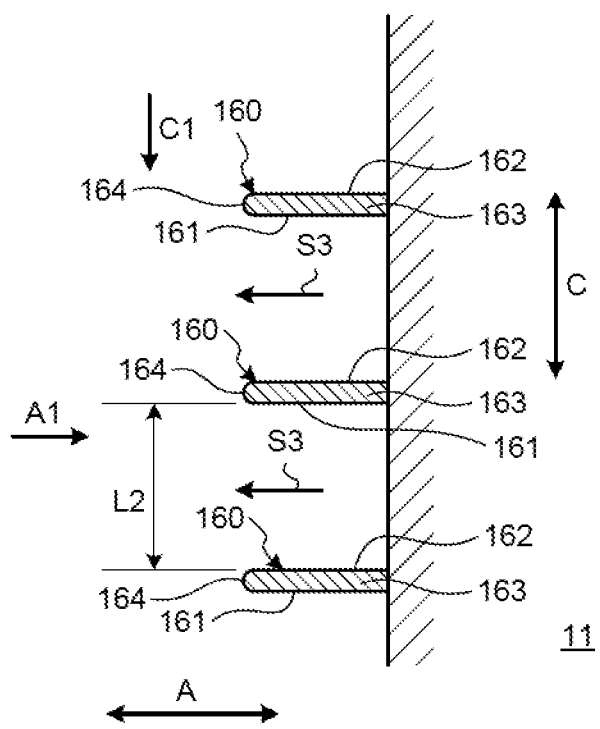
FIG. 25 is a cross-sectional view of the guiding member, illustrating the second modification of the eighth embodiment.

Note that the shape of the guiding member 160 is not limited to the aforementioned shape. FIG. 21 is a cross-sectional view for describing the shape of a guiding member according to a first modification of the eighth embodiment, FIG. 22 is a cross-sectional view taken along XXII-XXII in FIG. 21, illustrating the flow of the leakage steam with respect to the guiding member, and FIG. 23 is a cross-sectional view taken along XXIII-XXIII in FIG. 21, illustrating the flow of the leakage steam with respect to the guiding member. FIG. 24 and FIG. 25 are cross-sectional views illustrating a guiding member according to a second modification of the eighth embodiment. Note that FIG. 24 and FIG. 25 correspond to FIG. 22 and FIG. 23, respectively.

In the first modification of the eighth embodiment, as illustrated in FIG. 21 to FIG. 23, a guiding member 170 includes a first guiding surface 171 and a second guiding surface 172 that are inclined in the circumferential direction C with respect to the axial direction A of the rotor 12. The guiding member 170 is fixed to the inner circumferential surface 46, the first wall surface 47, and the second wall surface 48. The first guiding surface 171 is provided along the swirling direction of the leakage steam S2 leaking from the sealing device 16. The guiding member 170 includes an extension portion 173 with a plate shape extending from the first wall surface 47 of the swirling flow generation chamber 31 to the upstream side in the steam flow direction A1. The first guiding surface 171 is formed on a surface of the extension portion 173 on the downstream side in the rotational direction C1. The second guiding surface 172 is formed on a surface of the extension portion 173 on the upstream side in the rotational direction C1.

The inclination angle θ1 between the first guiding surface 171 and the axial direction A of the rotor 12 is the largest at the position facing the gap of the sealing device 15 on the downstream side in the steam flow direction A1, and the inclination angle θ1 becomes smaller to the outside and inside in the radial direction R of the rotor 12. In a manner similar to the first guiding surface 171, the inclination angle θ2 between the second guiding surface 172 and the axial direction A of the rotor 12 is the largest at the position facing the gap of the sealing device 15 on the downstream side in the steam flow direction A1, and the inclination angle θ2 becomes smaller to the outside and inside in the radial direction R of the rotor 12.

The thickness of the guiding member 170 in the circumferential direction C of the rotor 12 is the smallest at the position facing the gap of the sealing device 15 on the downstream side in the steam flow direction A1, and the thickness of the guiding member 170 in the circumferential direction C of the rotor 12 becomes larger to the outside and the inside in the radial direction R of the rotor 12. Therefore, the length of the interval between the guiding members 160 that are adjacent in the circumferential direction C of the rotor 12 is the largest at the position facing the gap on the downstream side in the steam flow direction A1 and becomes smaller to the outside and the inside in the radial direction R of the rotor 12. That is to say, the length L1 of the interval between the guiding members 160 that are adjacent at the position facing the gap of the sealing device 15 is larger than the length L2 of the interval between the guiding members 160 that are adjacent at the connection position to the inner circumferential surface 46 and the connection position to the second wall surface 48. In other words, L1>L2 is satisfied.

In the case of this modification, the length of the interval between the guiding members 160 that are adjacent in the circumferential direction C of the rotor 12 is the smallest on the outside and the inside in the radial direction R of the rotor 12; therefore, when the leakage steam S2 is discharged from the swirling flow generation chamber 31, the flow path, that is, the interval between the guiding members 160 that are adjacent becomes small and the velocity of the leakage steam S2 increases to become close to the velocity of the mainstream steam S1. Therefore, the leakage steam S4 smoothly joins the mainstream steam S1.

In the second modification of the eighth embodiment, as illustrated in FIG. 24 to FIG. 25, the guiding member 160 includes a first guiding surface 161 and a second guiding surface 162 that are inclined in the circumferential direction C with respect to the axial direction A of the rotor 12. The first guiding member 161 is provided in the swirling direction of the leakage steam S2 leaking from the sealing device 16. The first guiding surface 161 is formed on a surface of the extension portion 163 on the downstream side in the rotational direction C1. The second guiding surface 162 is formed on a surface of the extension portion 163 on the upstream side in the rotational direction C1. The inclination angle θ1 between the first guiding surface 161 and the axial direction A of the rotor 12 is the largest at the position facing the gap of the sealing device 15 on the downstream side in the steam flow direction A1, and the inclination angle θ1 becomes smaller to the outside and inside in the radial direction R of the rotor 12.

An end portion of the extension portion 163 on the upstream side in the steam flow direction A1 has a curved shape. That is to say, a curved portion 164 is provided at a tip of the extension portion 163 where the first guiding surface 91 and the second guiding surface 92 intersect. Note that an end portion of the extension portion 173 according to the first modification on the upstream side in the steam flow direction A1 may have a curved shape.

In the rotating machine according to the eighth embodiment, the length of the interval between the guiding members 160 and 170 that are adjacent in the circumferential direction C of the rotor 12 is the smallest at the position facing the gap of the sealing device 15 on the downstream side in the steam flow direction A1 and is larger to the outside and the inside in the radial direction R of the rotor 12. In addition, the length of the interval between the guiding members 160 and 170 that are adjacent in the circumferential direction C of the rotor 12 is the largest at the position facing the gap of the sealing device 15 on the downstream side in the steam flow direction A1 and is smaller to the outside and the inside in the radial direction R of the rotor 12.

Therefore, when the leakage steam S2 with the velocity component in the circumferential direction C is guided to the guiding members 160 and 170, the velocity component in the circumferential direction C is reduced. After that, when the swirling flow steam S3 is discharged from the swirling flow generation chamber 31, the steam passes through the outside and inside in the radial direction of the guiding members 160 and 170, so that the velocity is adjusted to become the proper velocity by decreasing or increasing. Accordingly, the velocity of the leakage steam S4 is adjusted in accordance with the velocity of the mainstream steam S1, and the leakage steam S4 can smoothly join the mainstream steam S1.

In the rotating machine according to the eighth embodiment, the end portion of the extension portion 163 on the upstream side in the steam flow direction A1 has a curved shape. Therefore, when the leakage steam S2 with the velocity component in the circumferential direction C collides with the extension portion 163, the leakage steam S2 is smoothly guided to the first guiding surface 161 and the second guiding surface 162 by the curved portion 164. Thus, the separation here can be suppressed. By smoothly guiding the leakage steam S2 to the first guiding surface 161, the velocity component in the circumferential direction C can be reduced.

In the aforementioned embodiments, the guiding member is provided in the entire region of the swirling flow generation chamber in the radial direction of the rotor; however, it is only necessary that the guiding member is positioned at least facing the gap of the sealing device in the axial direction and the outside or the inside in the radial direction at this position may be eliminated. That is to say, the guiding member may be fixed only to the first wall portion.

In the aforementioned embodiments, the sealing device is the labyrinth seal; however, another noncontact seal may be employed.

In the aforementioned embodiments, the rotating machine according to the present invention is used for the steam turbine 10; however, the rotating machine can be used not just for the steam turbine but also for other rotating machines in which the internal pressure becomes higher than the external pressure in the operation, such as a compressor or an exhaust turbine.

REFERENCE SIGNS LIST 10 steam turbine (rotating machine)
11 casing
11a inner circumferential surface
12 rotor
13 stator blade
14 rotor blade
15 sealing device
20 bearing
21 rotor disc
22 steam inlet
23 steam passage
24 blade cascade part
25 exhaust hood
26 steam discharge port
31 swirling flow generation chamber
32, 60, 70, 80, 90, 110, 120, 130, 140, 150, 160, 170 guiding member
33, 61, 71, 81, 91, 101, 111, 121, 131, 141, 151, 161, 171 first guiding surface
41 shroud
42 recessed portion
43, 44, 45 seal fin
46 inner circumferential surface
47 first wall surface
48 second wall surface
49 protrusion
51, 63, 73, 83, 93, 103, 113, 123, 133, 143, 153, 163, 173 extension portion
52, 62, 72, 82, 92, 102, 112, 122, 132, 142, 152, 162, 172 second guiding surface
94, 104, 164 curved portion
$\theta 1, \theta 2$ inclination angle
A axial direction
A1 steam flow direction
C circumferential direction
C1 rotational direction
L1, L2 length
R radial direction
S steam
S1 mainstream steam
S2 leakage steam
S3 swirling flow steam
S4 leakage steam

The invention claimed is:

1. A rotating machine comprising:
a casing having a hollow shape;
a rotator rotatably supported in the casing;
a stator blade fixed to an inner peripheral portion of the casing;
a rotor blade fixed to an outer peripheral portion of the rotator while being displaced from the stator blade in an axial direction of the rotator;
a sealing device disposed between the inner peripheral portion of the casing and a tip of the rotor blade;
a swirling flow generation chamber provided along a circumferential direction of the rotator on a downstream side of the sealing device in the casing in a fluid flow direction; and
a plurality of guiding members provided at predetermined intervals in the swirling flow generation chamber in the circumferential direction of the rotator, wherein
the guiding members each include a first guiding surface that is inclined in the circumferential direction with respect to the axial direction of the rotator.

2. The rotating machine according to claim 1, wherein the first guiding surface is provided along a swirling direction of fluid leaking from the sealing device.

3. The rotating machine according to claim 1, wherein an end portion of the first guiding surface on the downstream side in the fluid flow direction is inclined to a downstream side in a rotational direction of the rotator with respect to the axial direction of the rotator.

4. The rotating machine according to claim 1, wherein the guiding members each include an extension portion extending from the swirling flow generation chamber to an upstream side in the fluid flow direction, and the first guiding surface is formed on a surface of the extension portion on a downstream side in a rotational direction of the rotator.

5. The rotating machine according to claim 4, wherein the first guiding surface includes a base end surface extending from the casing side to the upstream side in the fluid flow direction, and a front end surface curved from the base end surface to the upstream side in the fluid flow direction and an upstream side in the rotational direction of the rotator.

6. The rotating machine according to claim 4, wherein the first guiding surface includes a base end surface extending from the casing side to the upstream side in the fluid flow direction and the downstream side in the rotational direction of the rotator, and a front end surface curved from the base end surface to the upstream side in the fluid flow direction and an upstream side in the rotational direction of the rotator.

7. The rotating machine according to claim 4, wherein an end portion of the extension portion on the upstream side in the fluid flow direction has a curved shape.

8. The rotating machine according to claim 1, wherein the sealing device includes a seal fin extending from one of the inner peripheral portion of the casing and the tip of the rotor blade to the other and forming a gap, an inclination angle between the first guiding surface and the axial direction of the rotator is largest at a position facing the gap on the downstream side in the fluid flow direction, and the inclination angle becomes smaller to an outside and an inside in a radial direction of the rotator.

9. The rotating machine according to claim 8, wherein a length of the interval between the guiding members that are adjacent in the circumferential direction of the rotator is smallest at the position facing the gap on the downstream side in the fluid flow direction and becomes larger to the outside and the inside in the radial direction of the rotator.

10. The rotating machine according to claim 8, wherein a length of the interval between the guiding members that are adjacent in the circumferential direction of the rotator is largest at the position facing the gap on the downstream side in the fluid flow direction and becomes smaller to the outside and the inside in the radial direction of the rotator.

11. The rotating machine according to claim 1, wherein the guiding members each include a second guiding surface on a surface on an upstream side in a rotational direction of the rotator, and an end portion of the second guiding surface on the downstream side in the fluid flow direction is inclined to a downstream side in the rotational direction of the rotator with respect to the axial direction of the rotator.

12. The rotating machine according to claim 1, wherein the guiding members each include a second guiding surface on a surface on an upstream side in a rotational direction of the rotator, and an end portion of the second guiding surface on the downstream side in the fluid flow direction is inclined to the upstream side in the rotational direction of the rotator with respect to the axial direction of the rotator.

13. The rotating machine according to claim 1, wherein the swirling flow generation chamber includes an inner circumferential surface of the casing, a first wall surface facing the sealing device in the casing on the downstream side in the fluid flow direction, and a second wall surface facing the inner circumferential surface of the casing on an inside in the radial direction of the rotator, and the guiding members are fixed to the inner circumferential surface of the casing, the first wall surface, and the second wall surface.

* * * * *